US012000621B2

(12) United States Patent
Bae et al.

(10) Patent No.: US 12,000,621 B2
(45) Date of Patent: Jun. 4, 2024

(54) WIND-DIRECTION ADJUSTABLE AIR PURIFIER

(71) Applicant: COWAY CO., LTD., Chungcheongnam-do (KR)

(72) Inventors: Jun-Hyoung Bae, Seoul (KR); Chan-Jung Park, Seoul (KR); In-Kyu Back, Seoul (KR); Sang-Woo Kang, Seoul (KR); Tae-Seok Shin, Seoul (KR)

(73) Assignee: COWAY CO., LTD., Chungcheongnam-Do (KR)

( * ) Notice: Subject to any disclaimer, the term of this patent is extended or adjusted under 35 U.S.C. 154(b) by 1171 days.

(21) Appl. No.: 16/346,636

(22) PCT Filed: Dec. 7, 2017

(86) PCT No.: PCT/KR2017/014269
§ 371 (c)(1),
(2) Date: May 1, 2019

(87) PCT Pub. No.: WO2018/106033
PCT Pub. Date: Jun. 14, 2018

(65) Prior Publication Data
US 2020/0063991 A1 Feb. 27, 2020

(30) Foreign Application Priority Data

Dec. 7, 2016 (KR) .......................... 10-2016-0165032
Dec. 26, 2016 (KR) .......................... 10-2016-0179328

(51) Int. Cl.
*F24F 8/80* (2021.01)
*F24F 3/14* (2006.01)
(Continued)

(52) U.S. Cl.
CPC ................. *F24F 8/80* (2021.01); *F24F 3/14* (2013.01); *F24F 8/117* (2021.01); *F24F 13/065* (2013.01);
(Continued)

(58) Field of Classification Search
CPC .... F24F 3/16; F24F 3/14; F24F 13/065; F24F 13/20; F24F 8/108; F24F 8/117; F24F 8/20; F24F 8/50; Y02A 50/20
See application file for complete search history.

(56) References Cited

U.S. PATENT DOCUMENTS 8,197,226 B2 * 6/2012 Fitton .................... F04D 25/08
417/198
9,291,361 B2 * 3/2016 Staniforth ............. F04D 29/705
(Continued)

FOREIGN PATENT DOCUMENTS

| CN | 103363587 | 10/2013 |
| CN | 104748243 | 7/2015 |

(Continued)

OTHER PUBLICATIONS

EPO translation of KR 2014 0028191 (Year: 2014).*
(Continued)

*Primary Examiner* — Stephen Hobson
(74) *Attorney, Agent, or Firm* — Dority & Manning, P.A.

(57) ABSTRACT

A wind-direction adjustable air purifier according to an embodiment of the present invention comprises: a housing provided with an air discharge opening formed on one surface thereof; an air guide having a front end disposed in a center of the air discharge opening and a rear end extending toward the other surface of the housing such that the air discharge opening has a ring shape; and a rotation guide coupled to the inside of the housing so as be rotatable in the circumferential direction of the air discharge opening, and
(Continued)

supporting the air guide in by the housing, wherein the air guide can be coupled to the rotation guide so as to be rotatable in a direction inclined relative to the air discharge direction of the air discharge opening.

9 Claims, 29 Drawing Sheets

(51) Int. Cl.
*F24F 8/117* (2021.01)
*F24F 13/065* (2006.01)
*F24F 13/20* (2006.01)
*F24F 8/108* (2021.01)
*F24F 8/20* (2021.01)
*F24F 8/50* (2021.01)

(52) U.S. Cl.
CPC .............. *F24F 13/20* (2013.01); *F24F 8/108* (2021.01); *F24F 8/20* (2021.01); *F24F 8/50* (2021.01)

(56) References Cited

U.S. PATENT DOCUMENTS

| | | | |
|---|---|---|---|
| 9,366,449 B2* | 6/2016 | Staniforth | F24F 13/26 |
| 9,816,531 B2* | 11/2017 | Simmonds | F04D 29/403 |
| 9,926,804 B2* | 3/2018 | Nicolas | F04D 25/08 |
| 9,927,136 B2* | 3/2018 | Staniforth | F24F 6/14 |
| 9,951,791 B2* | 4/2018 | Jung | F04D 29/563 |
| 10,434,448 B1* | 10/2019 | Honnecke | F24F 13/28 |
| 10,612,565 B2* | 4/2020 | Staniforth | F24F 6/14 |
| 2006/0201119 A1* | 9/2006 | Song | B01D 53/007 |
| | | | 55/471 |
| 2010/0150699 A1* | 6/2010 | Nicolas | F04F 5/46 |
| | | | 415/90 |
| 2010/0225012 A1* | 9/2010 | Fitton | B05B 17/0615 |
| | | | 261/28 |
| 2010/0226750 A1* | 9/2010 | Gammack | F04F 5/16 |
| | | | 416/205 |
| 2010/0226751 A1* | 9/2010 | Gammack | F04D 25/10 |
| | | | 416/100 |
| 2010/0226797 A1* | 9/2010 | Fitton | F24F 7/06 |
| | | | 417/313 |
| 2012/0031509 A1* | 2/2012 | Wallace | F04D 25/08 |
| | | | 137/338 |
| 2014/0053591 A1* | 2/2014 | Shin | F24F 13/20 |
| | | | 62/285 |
| 2016/0032942 A1* | 2/2016 | Jung | F04D 19/002 |
| | | | 415/148 |
| 2016/0047609 A1* | 2/2016 | Gauthier | B60H 3/0633 |
| | | | 165/303 |
| 2016/0084510 A1* | 3/2016 | Sun | F24F 7/007 |
| | | | 62/426 |
| 2017/0248339 A1* | 8/2017 | Mun | B01D 46/0047 |
| 2018/0093216 A1* | 4/2018 | Kang | B01D 46/00 |

FOREIGN PATENT DOCUMENTS

| | | |
|---|---|---|
| EP | 2602563 | 6/2013 |
| JP | S46027788 | 9/1971 |
| JP | 10288391 | 10/1998 |
| JP | 2002103957 | 4/2002 |
| JP | 2011177246 | 9/2011 |
| JP | 2012180977 | 9/2012 |
| JP | 2016511384 | 4/2016 |
| KR | 1020050046082 | 5/2005 |
| KR | 100977369 | 8/2010 |
| KR | 2014 0028191 | * 3/2014 |
| KR | 20140028191 | 3/2014 |
| KR | 20140089068 | * 7/2014 |
| KR | 20140093158 | 7/2014 |
| KR | 20150092067 | 8/2015 |
| KR | 20160017587 | 2/2016 |

OTHER PUBLICATIONS

EPO translation of KR 20140089068 (Year: 2014).*
International Search Report for PCT/KR2017/014269, dated May 29, 2018, 4 pages.

* cited by examiner

【FIG. 1】
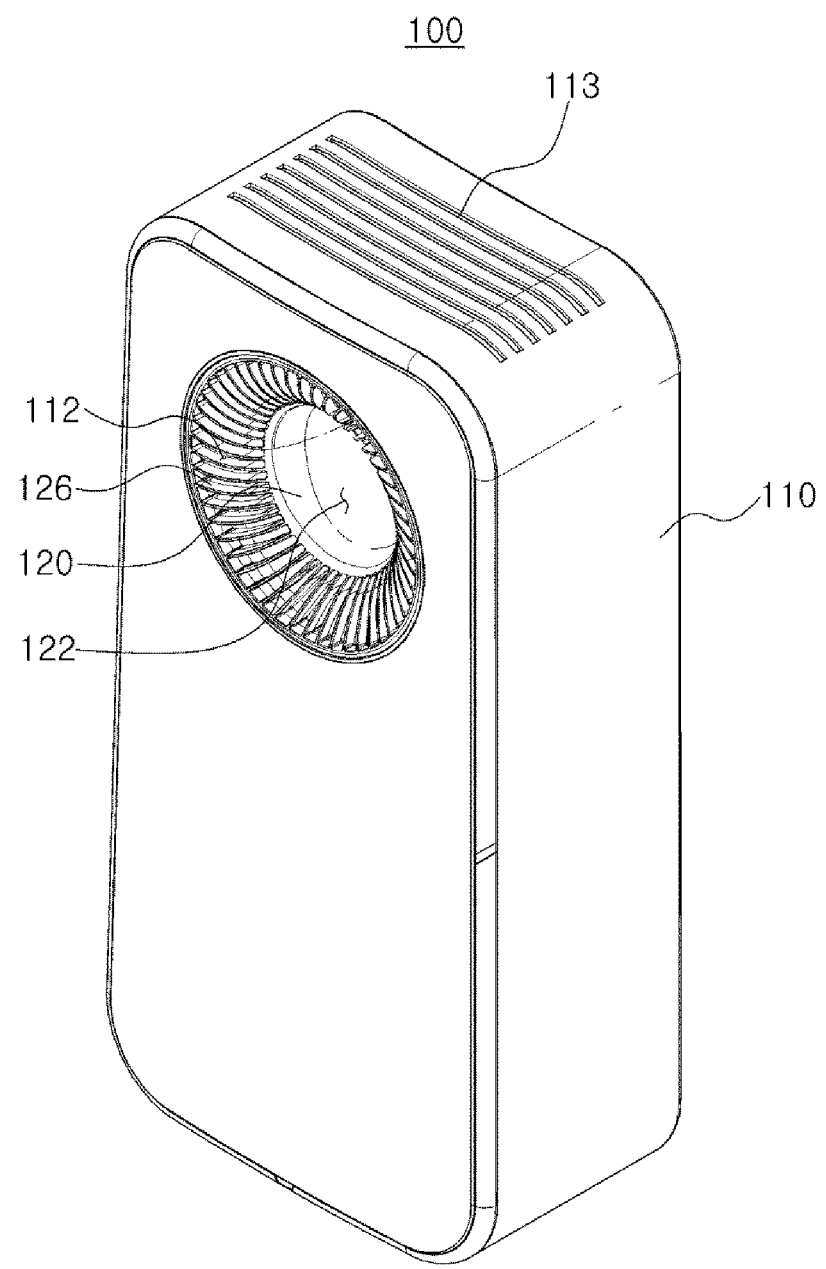

【FIG. 2】
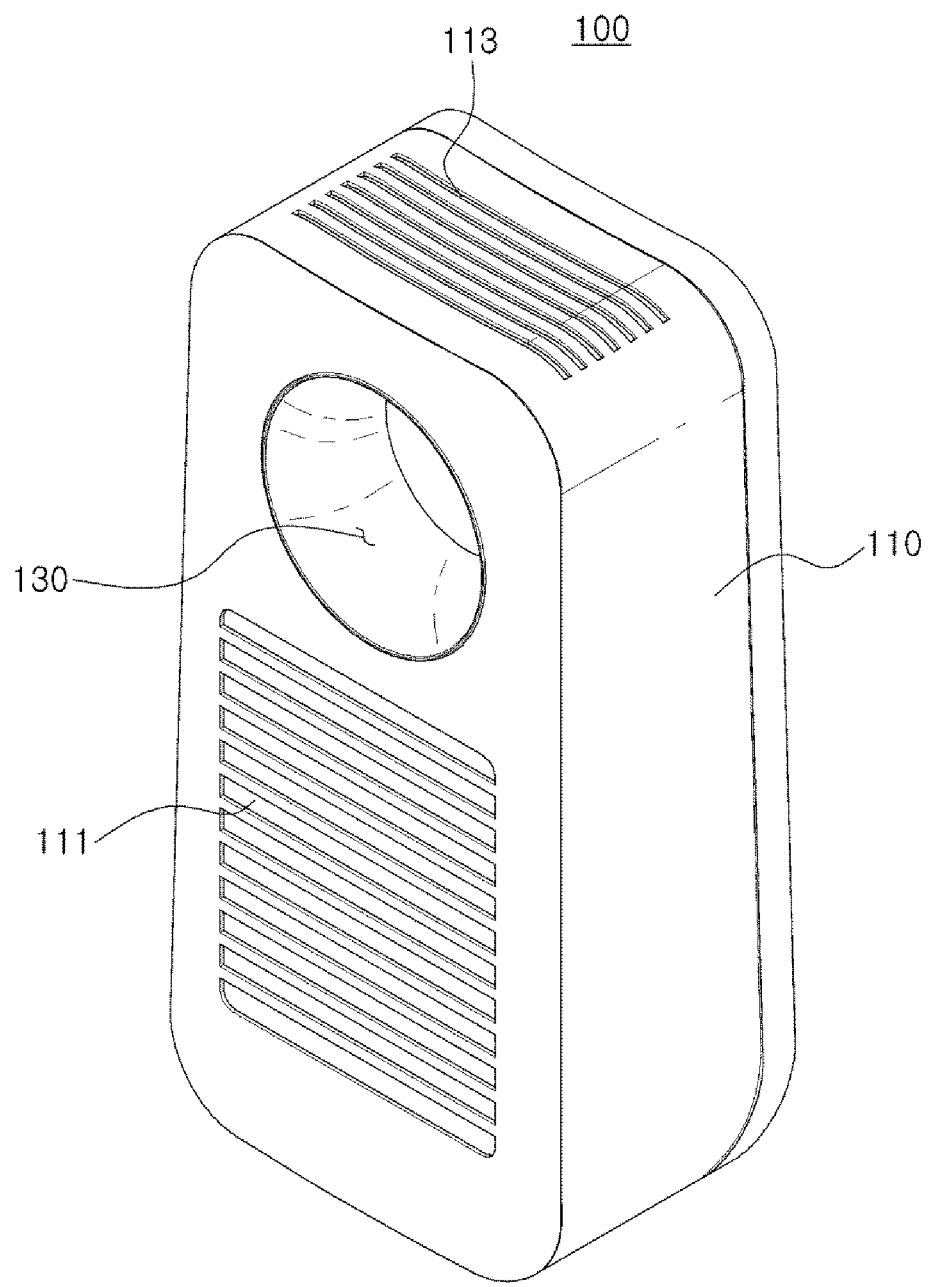

[FIG. 3]
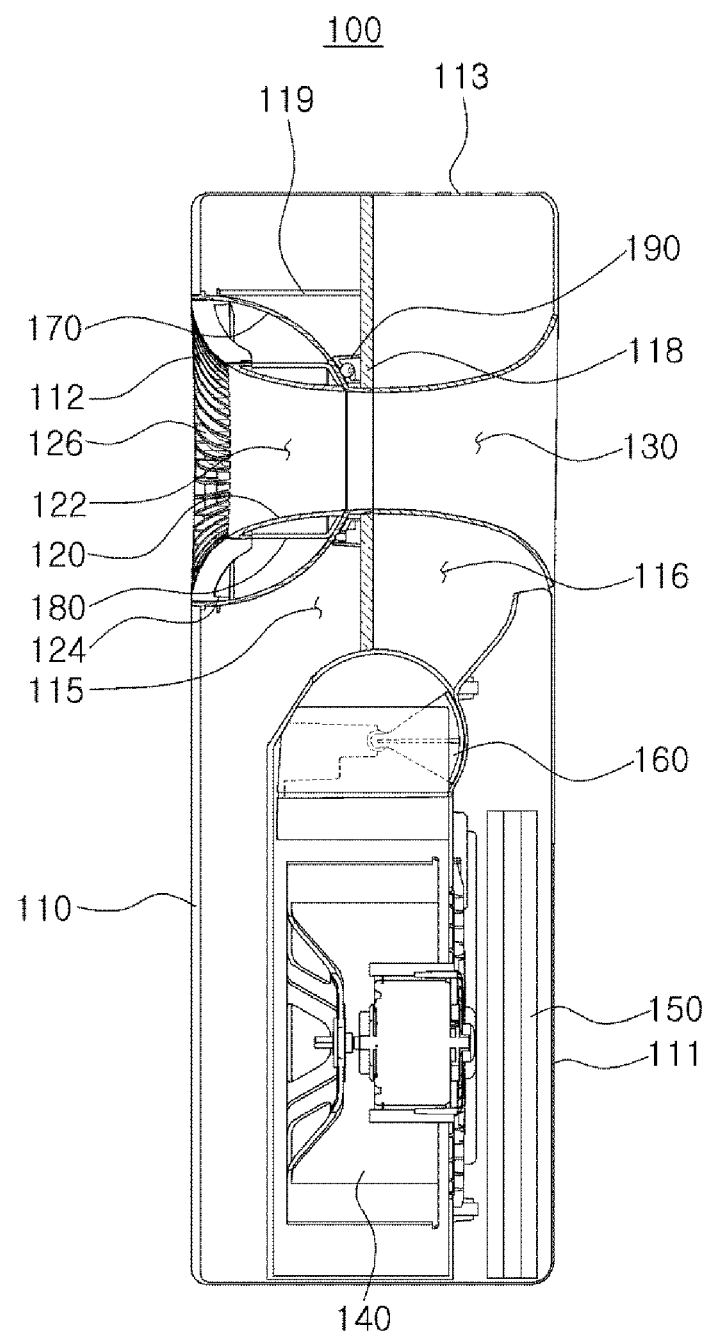

[FIG. 4]
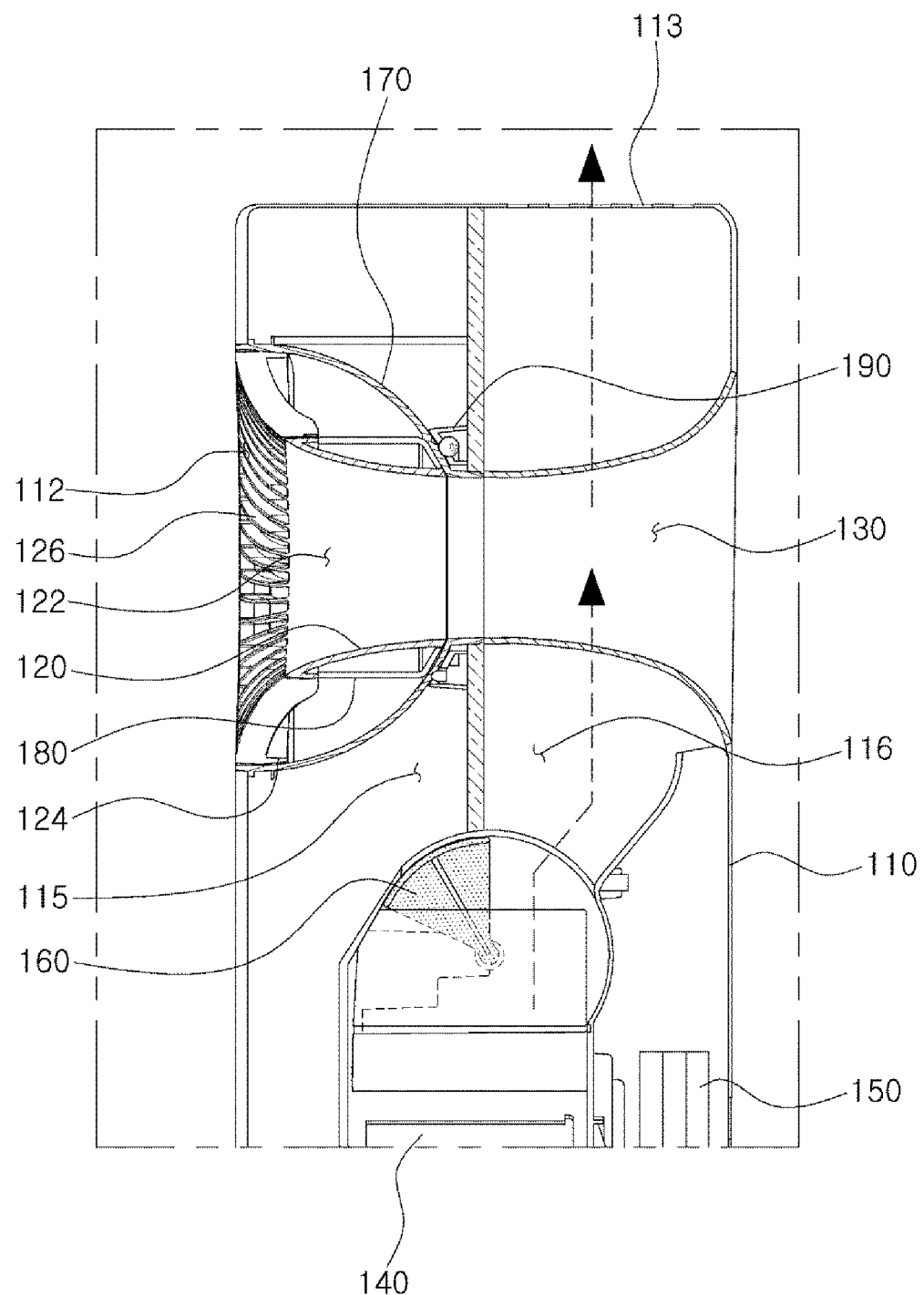

[FIG. 5]
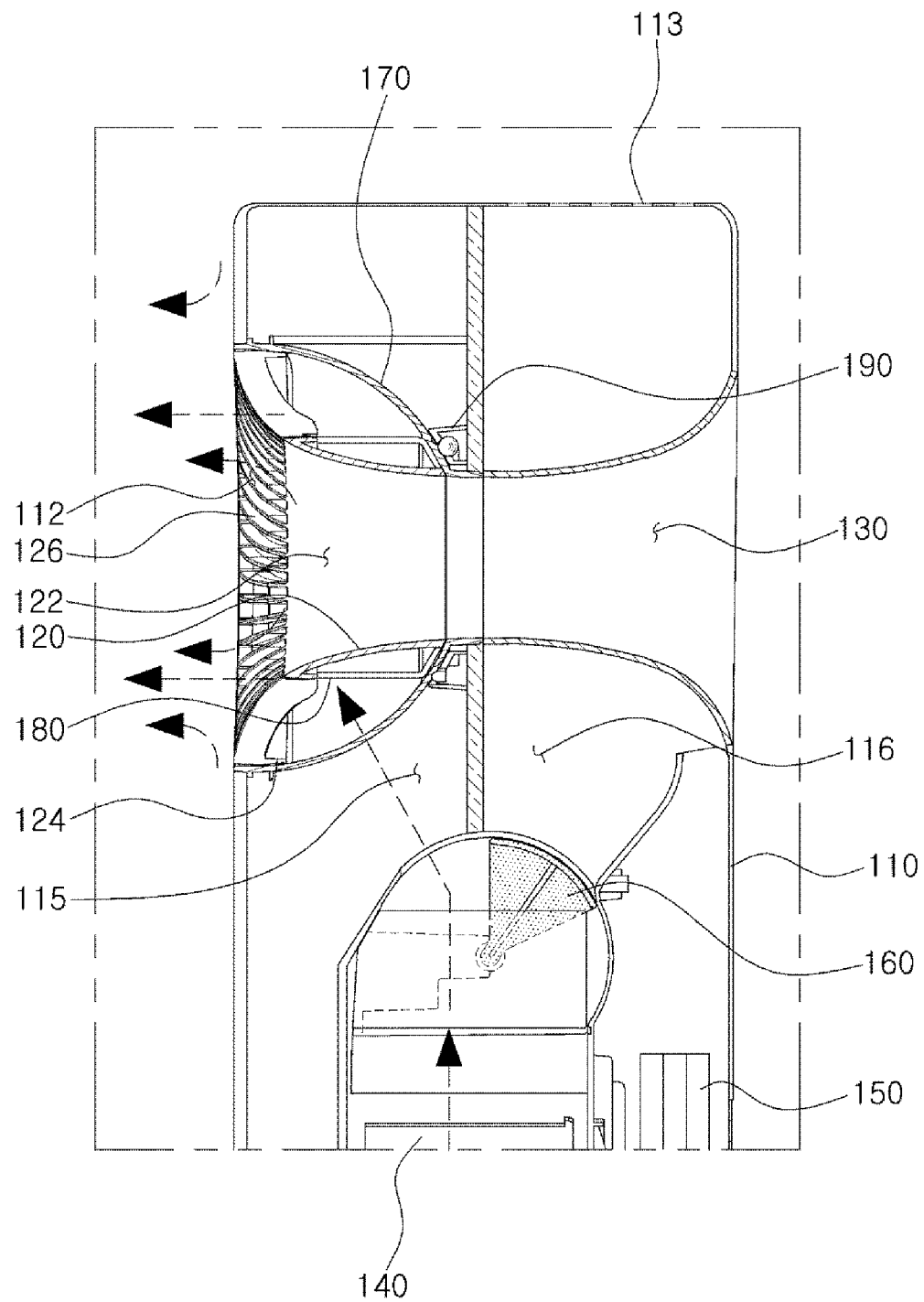

[FIG. 6]
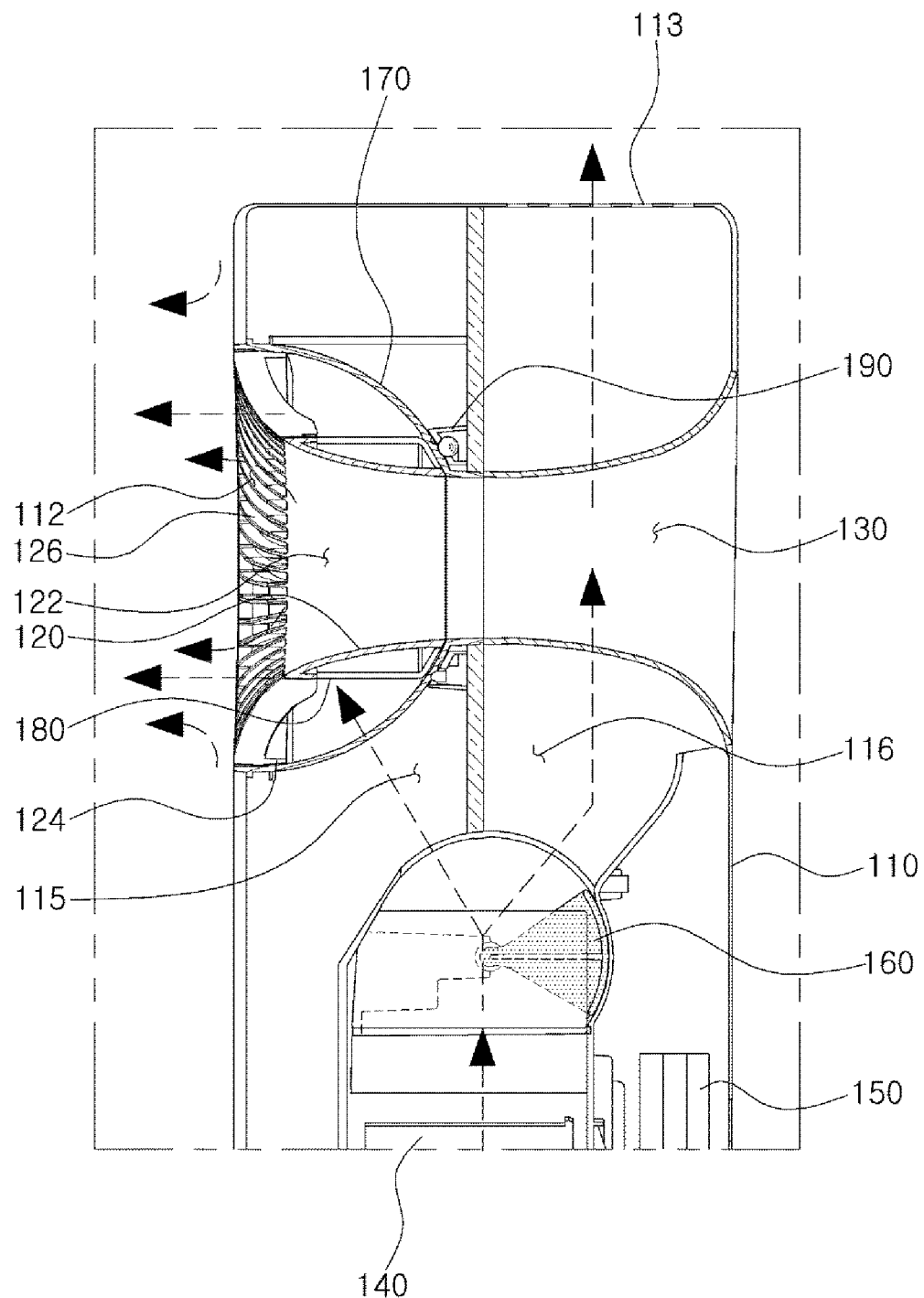

[FIG. 7A]
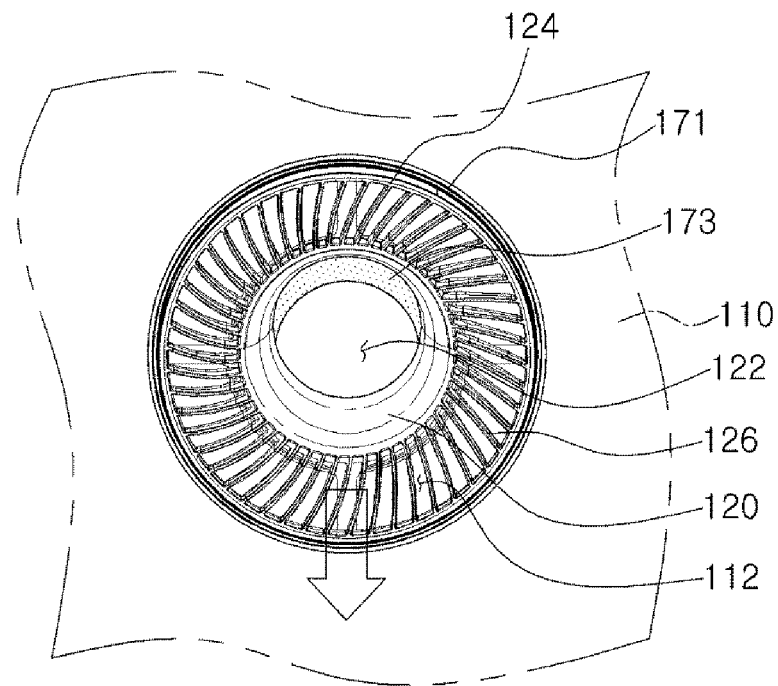
[FIG. 7B]
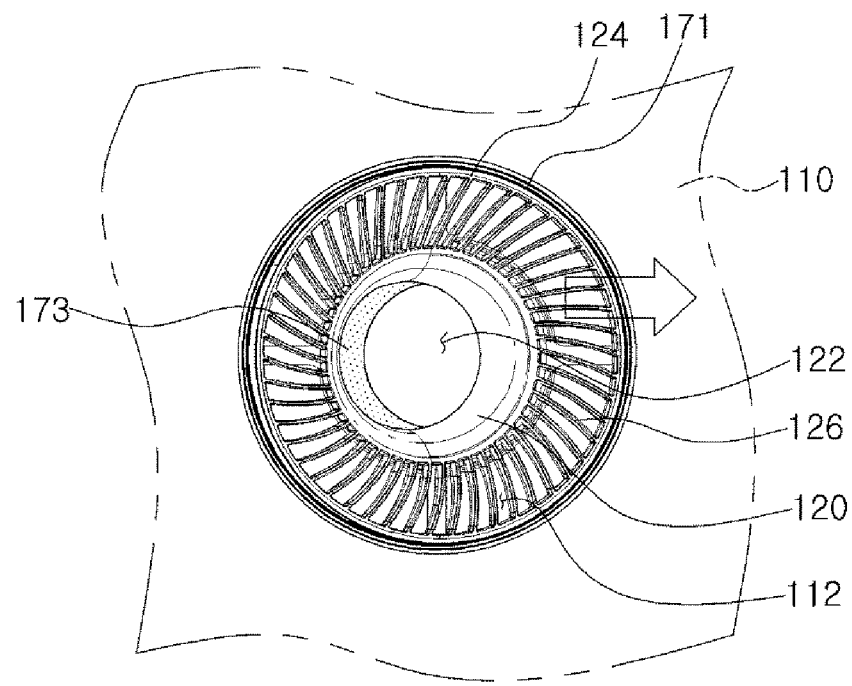

[FIG. 8]
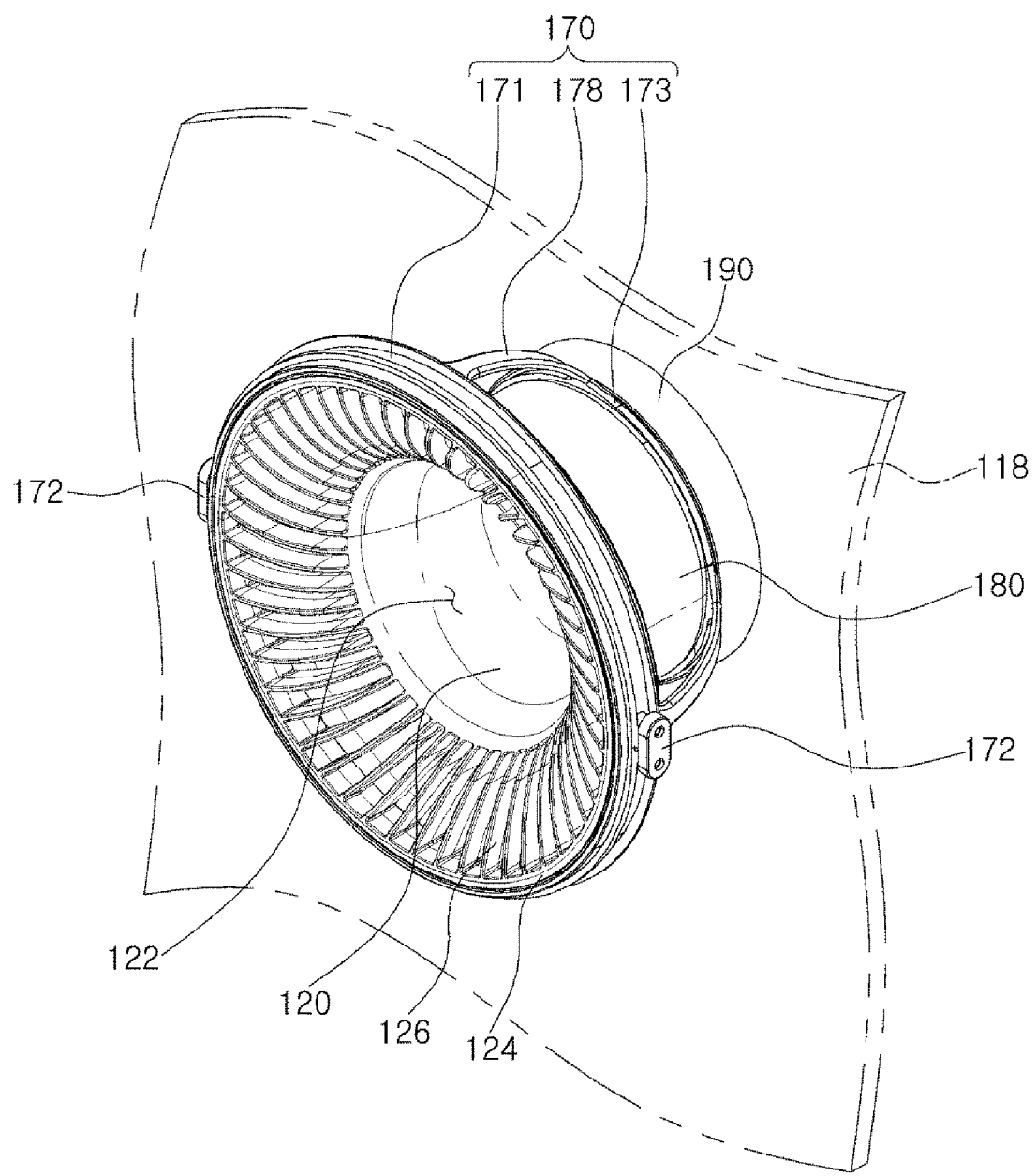

[FIG. 9]
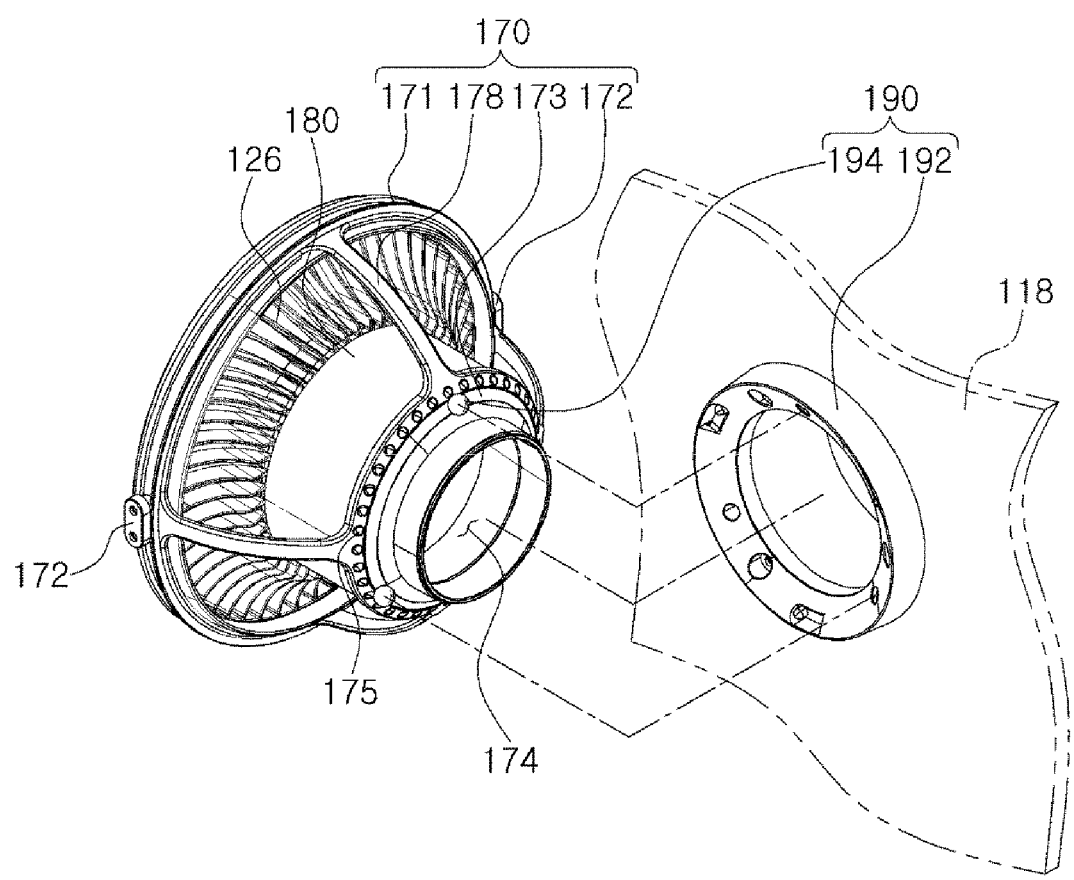

【FIG. 10】
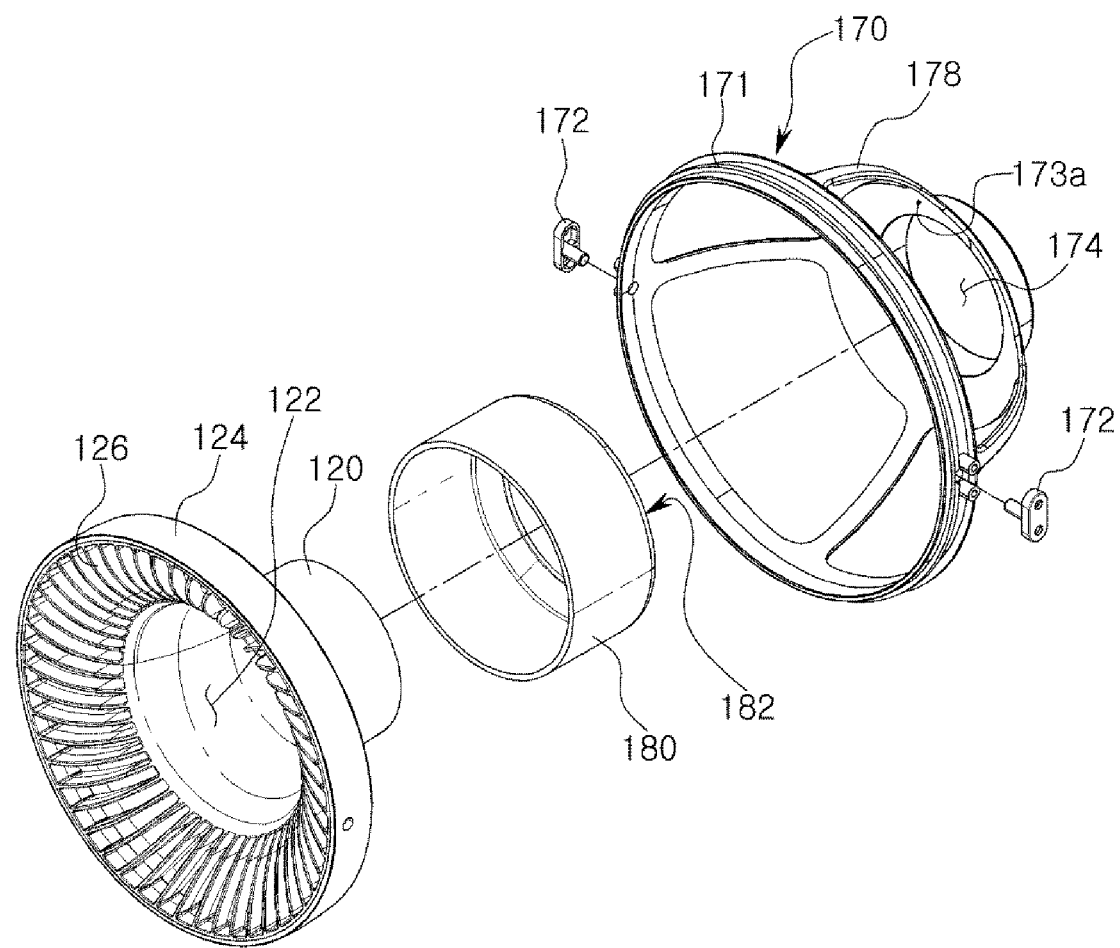

[FIG. 11]
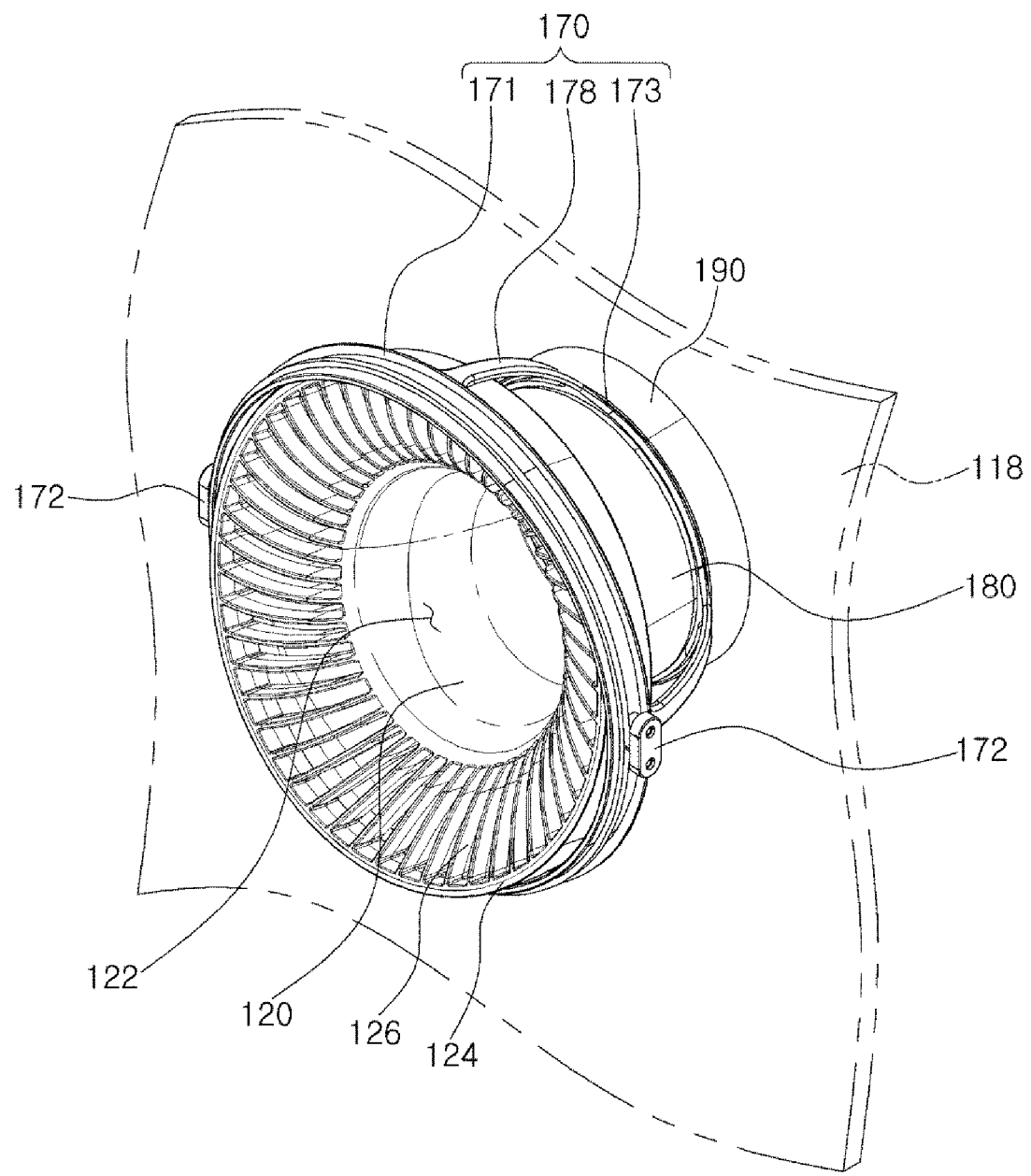

[FIG. 12]
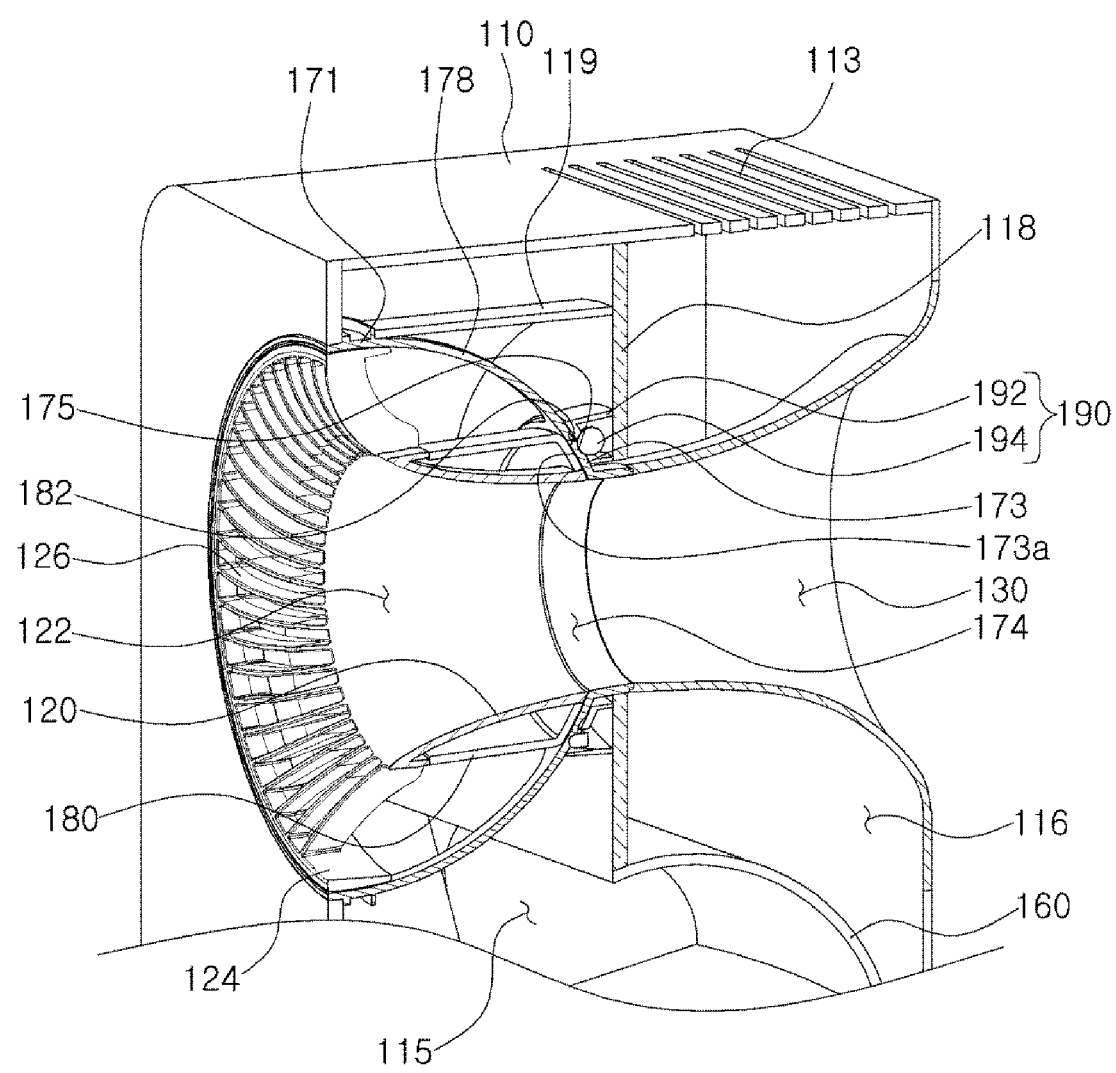

[FIG. 13]
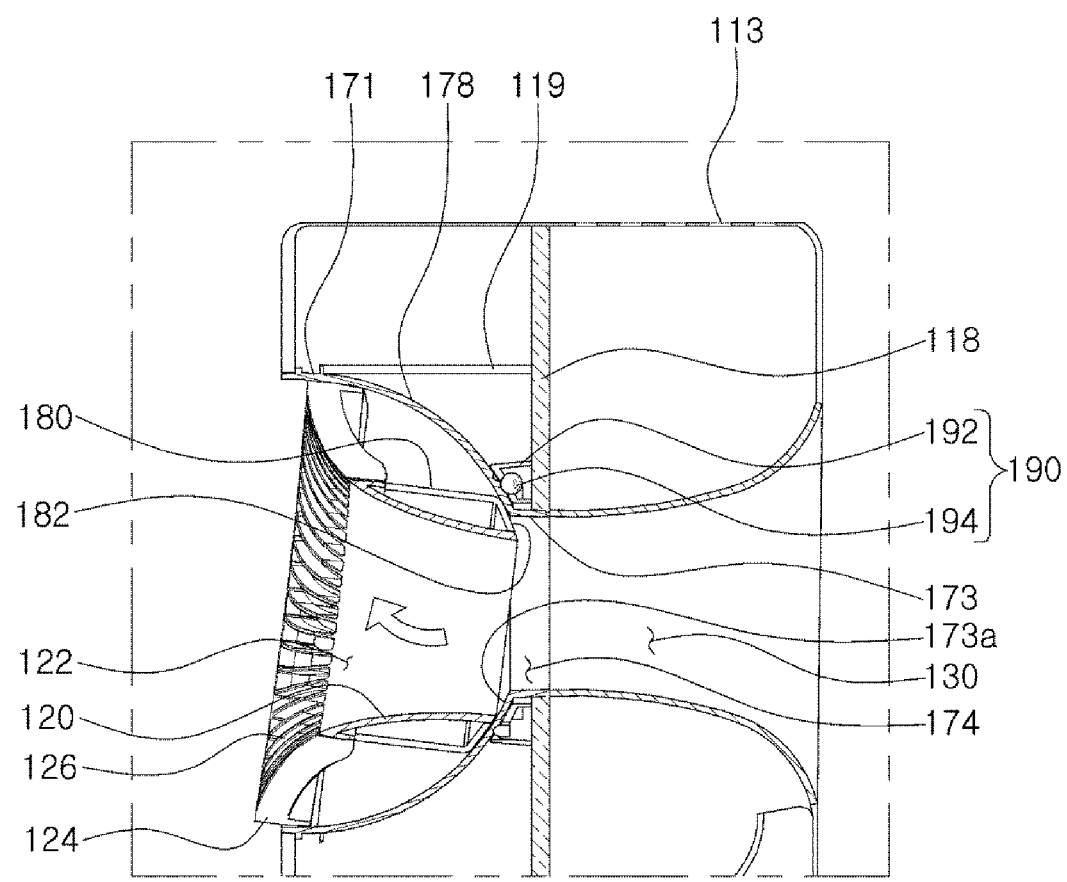

[FIG. 14]
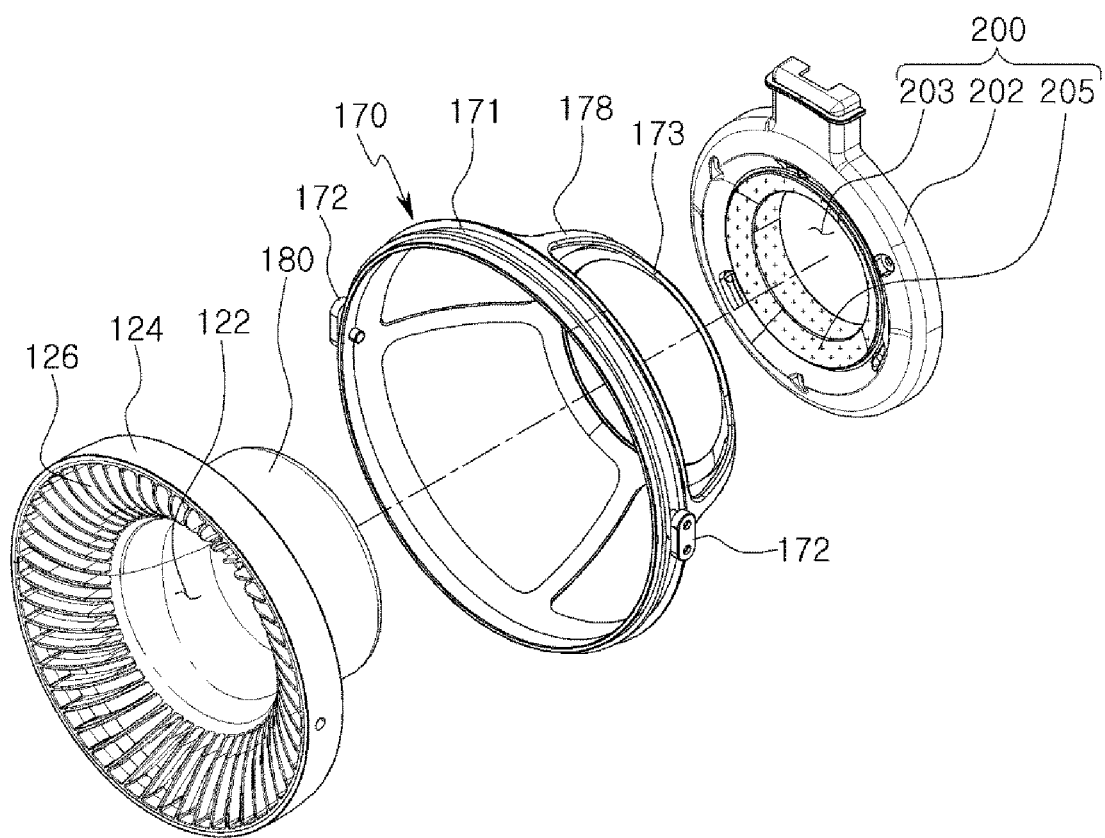

【FIG. 15】
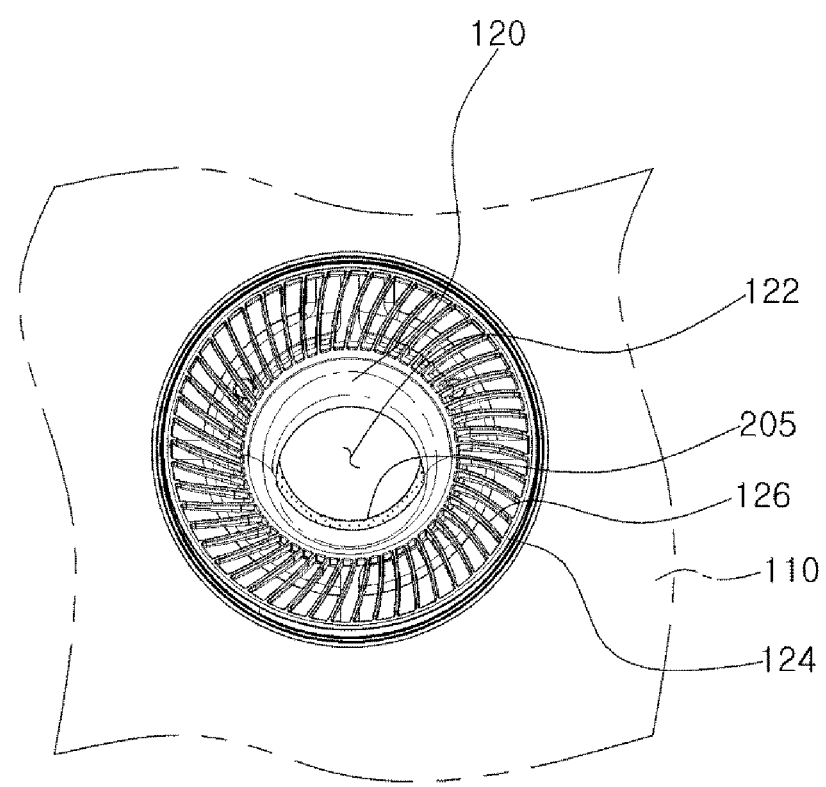

[FIG. 16]
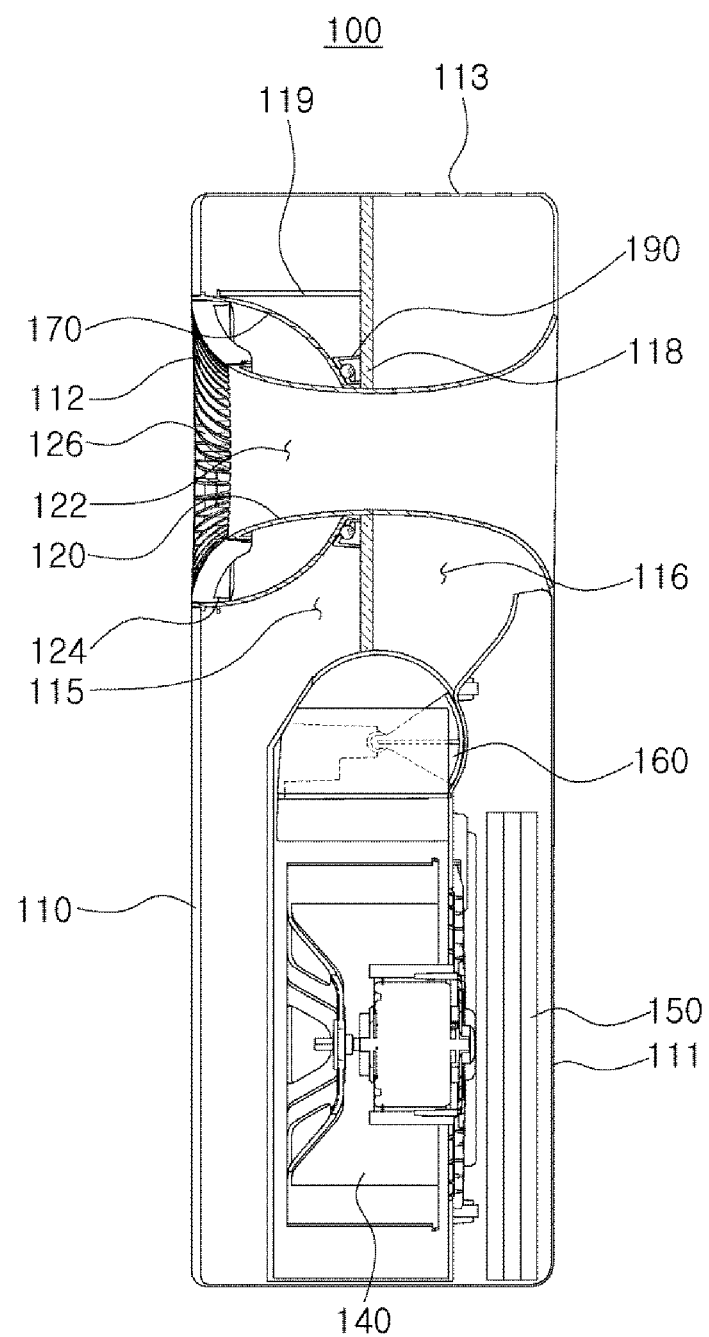

【FIG. 17】
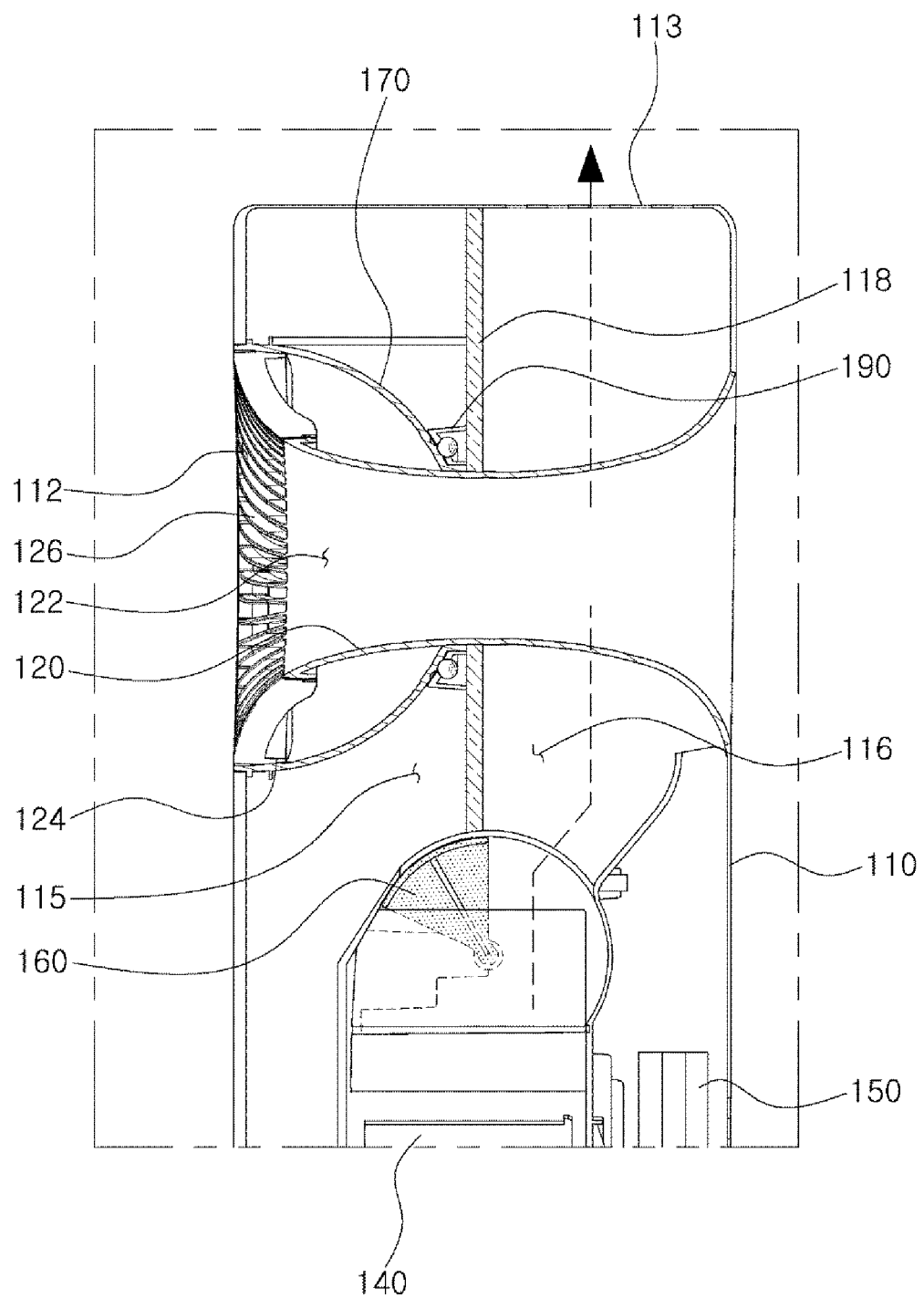

【FIG. 18】
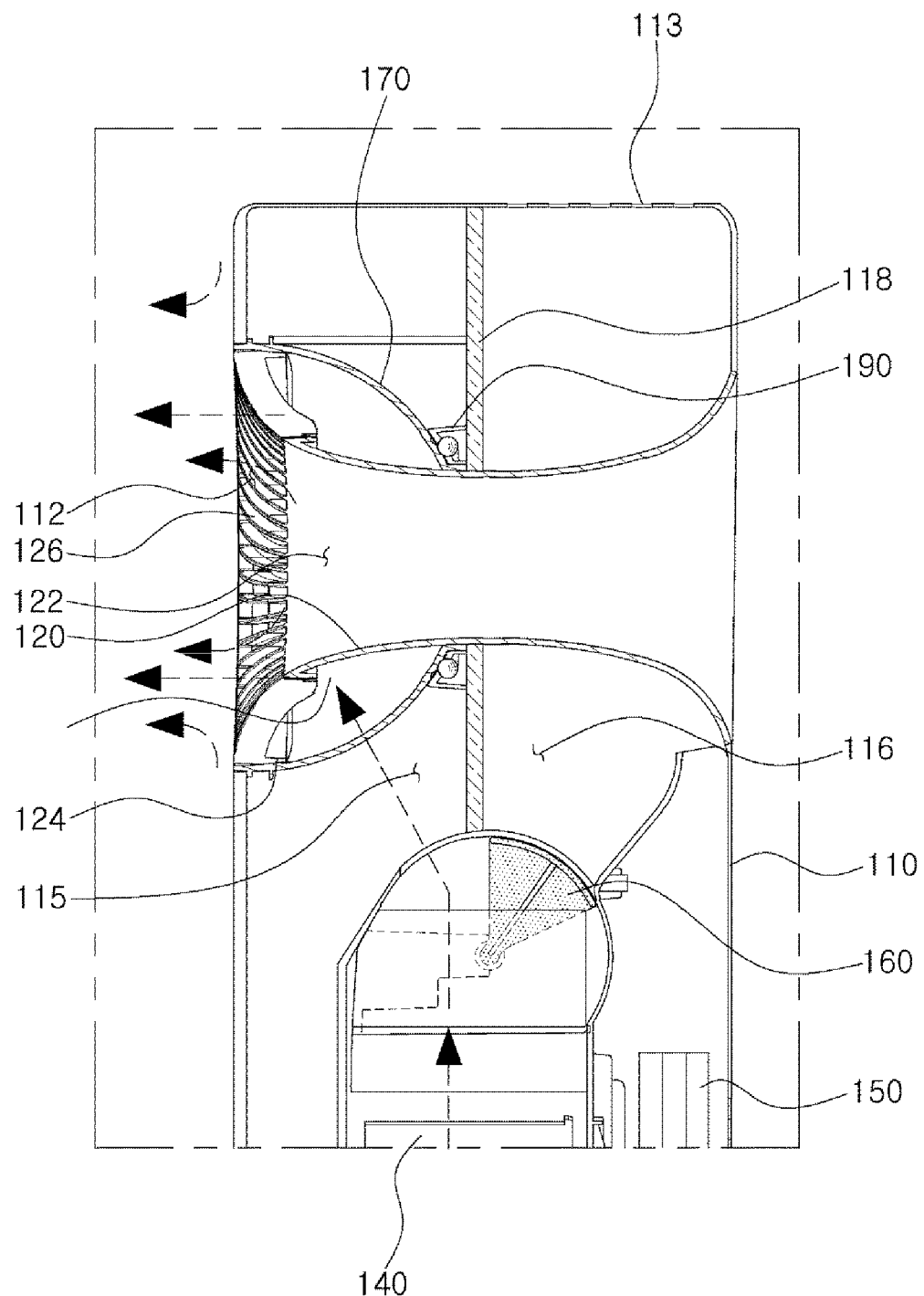

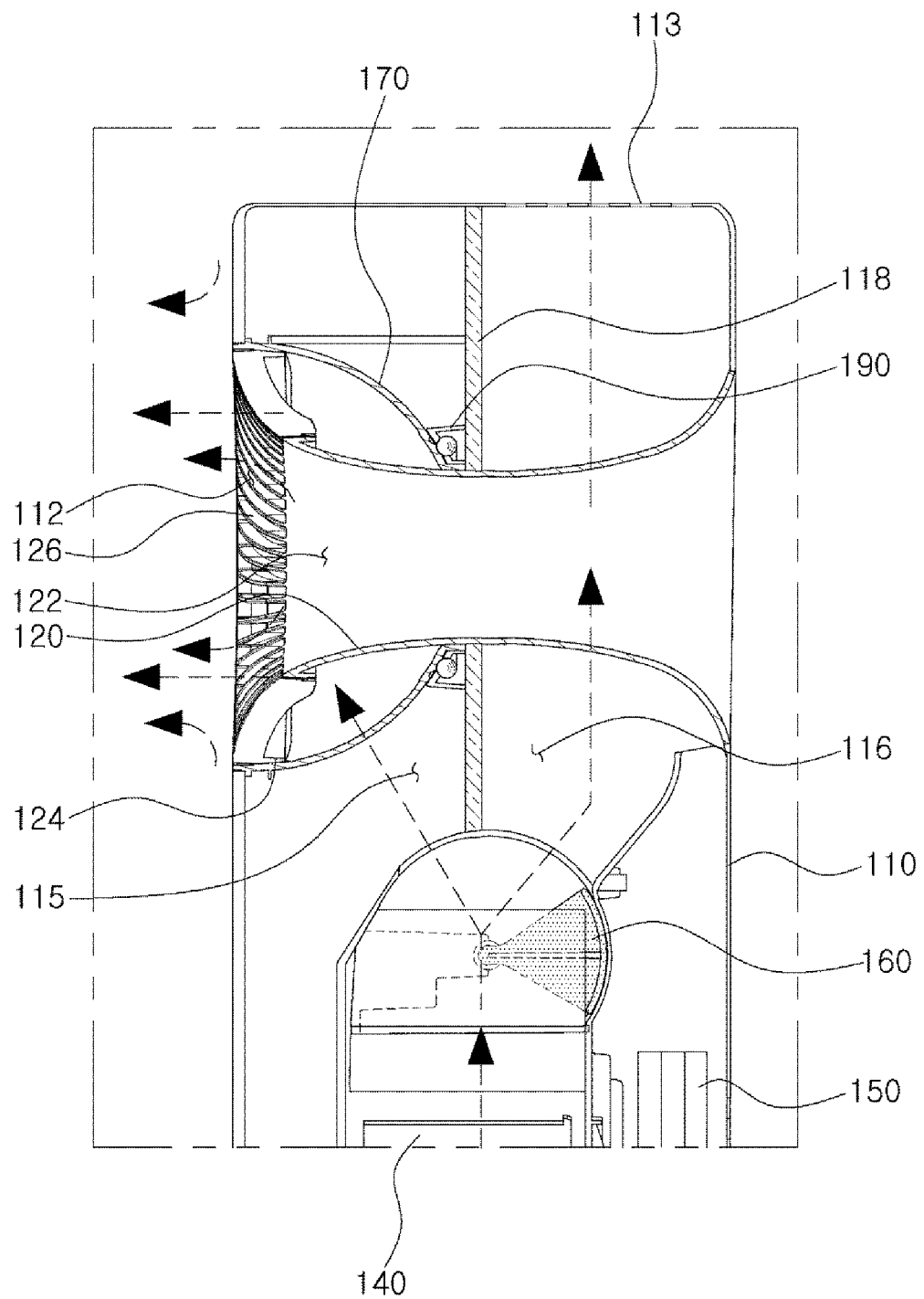
[FIG. 19]

【FIG. 20】
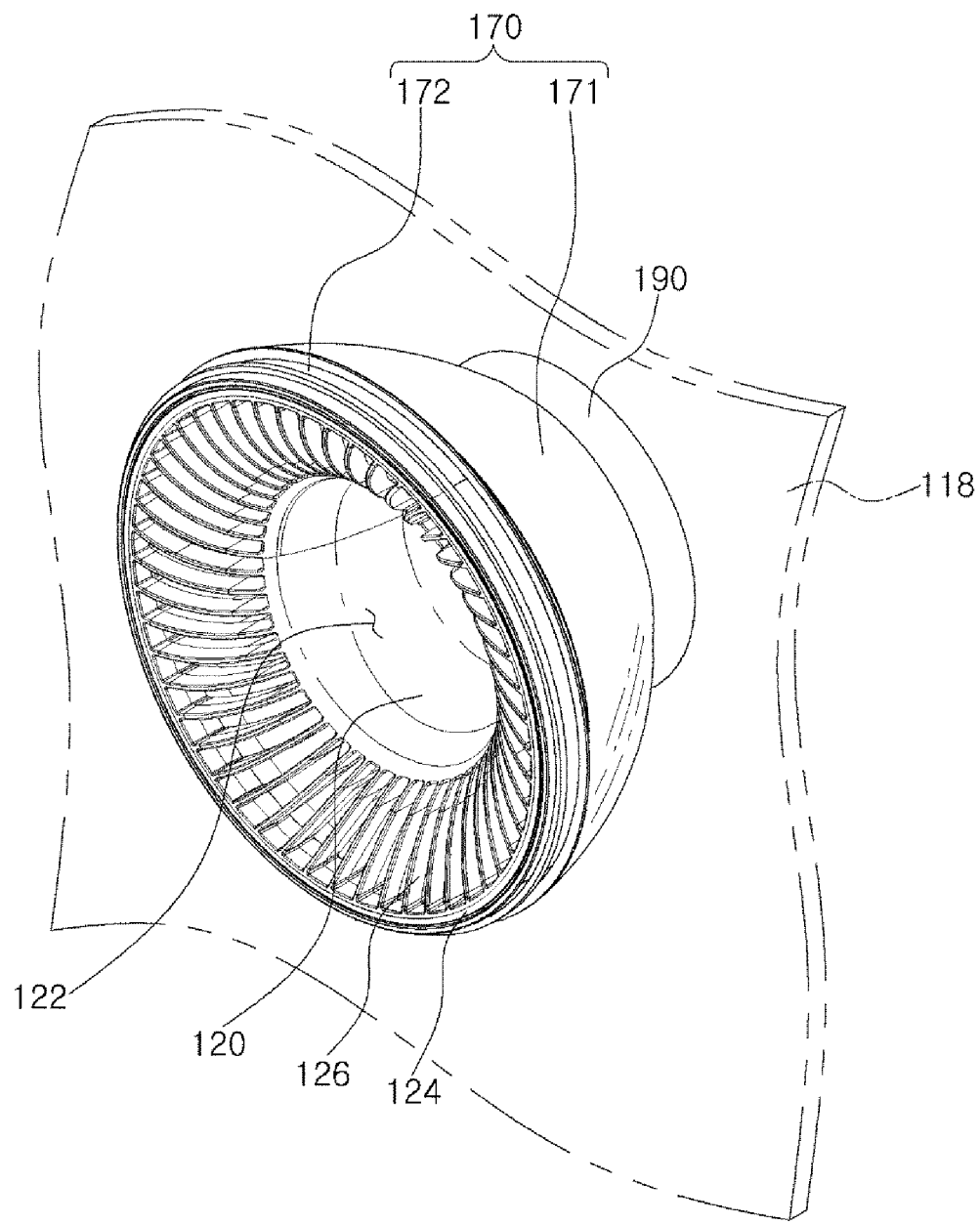

[FIG. 21]
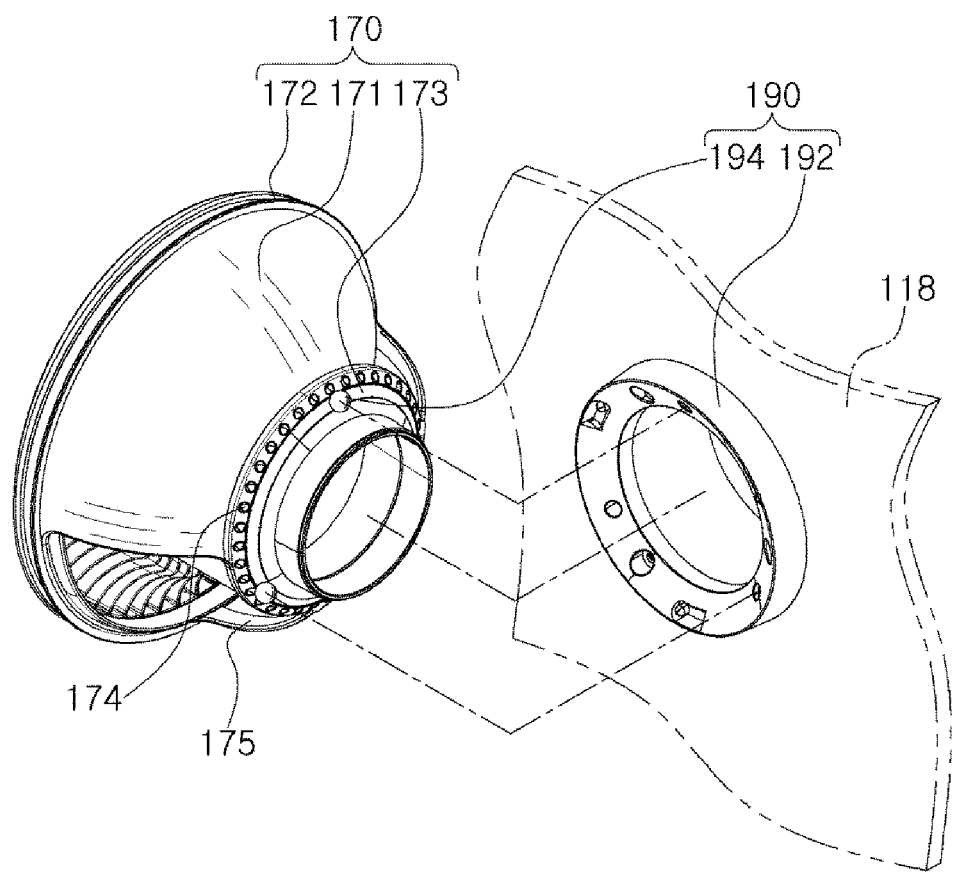

[FIG. 22]
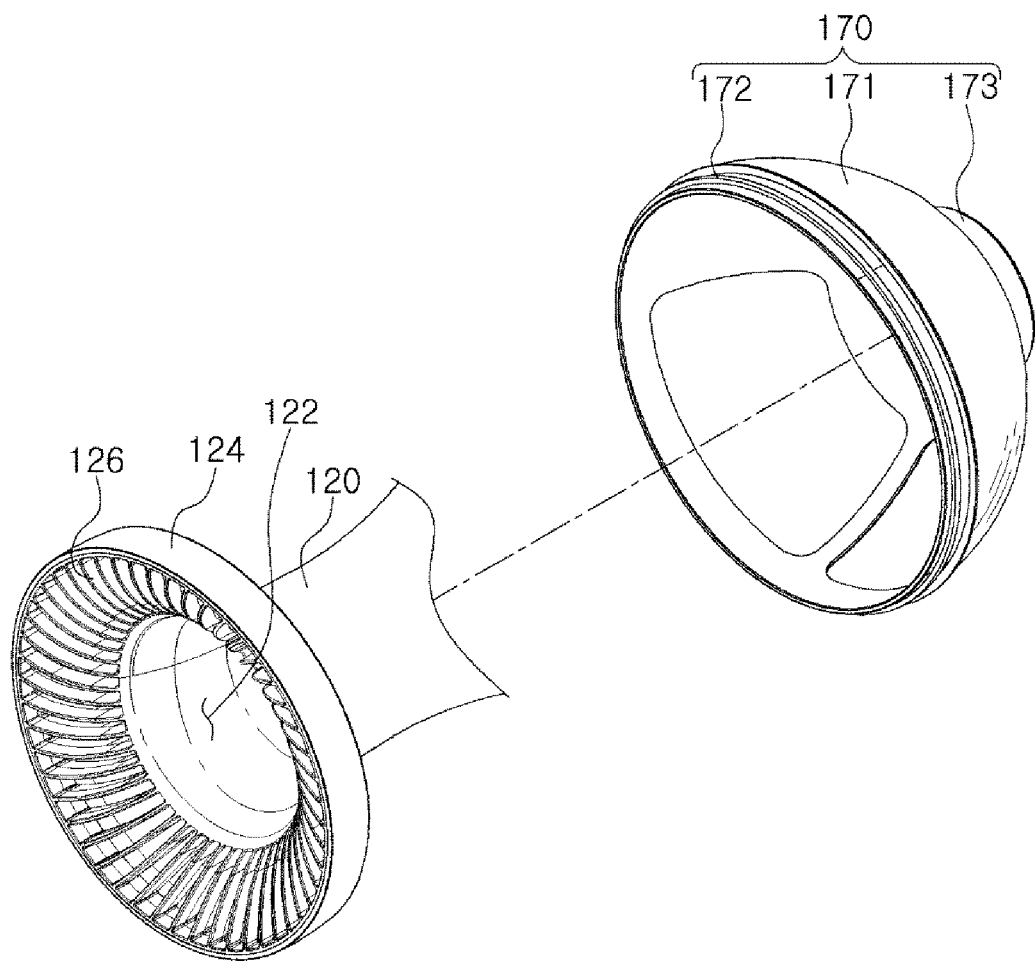

【FIG. 23】
170
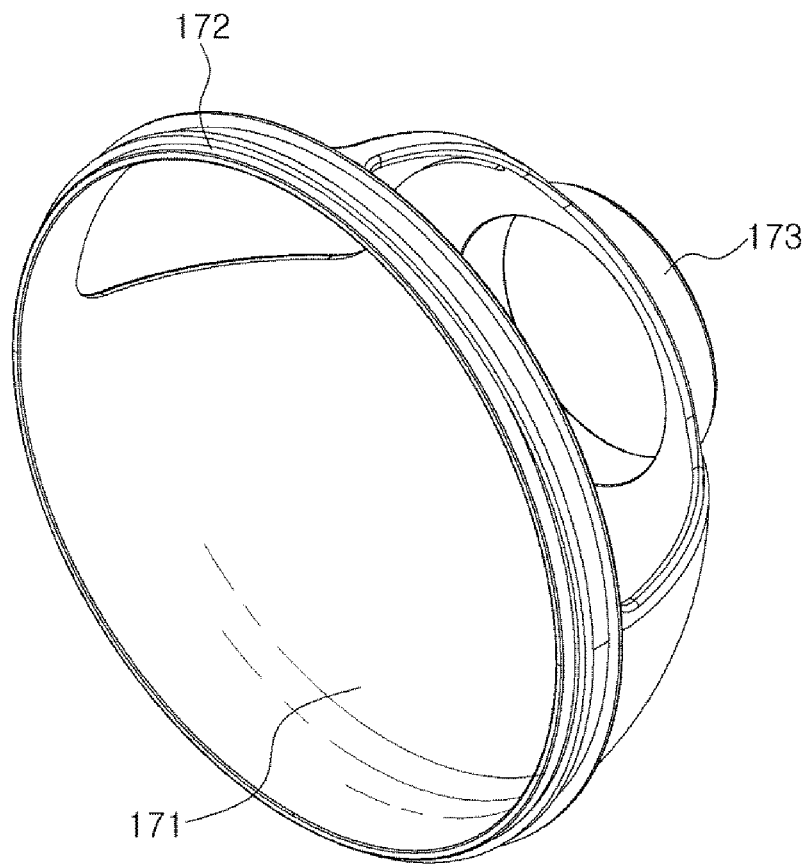
【FIG. 24A】
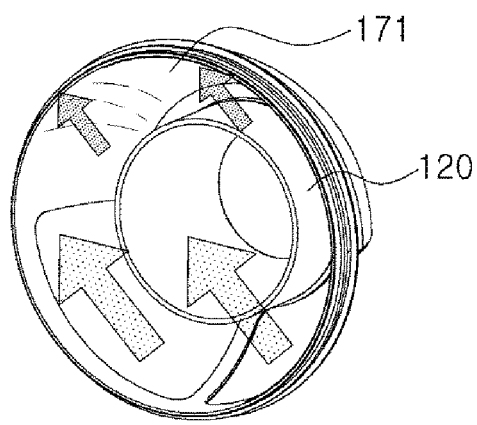

【FIG. 24B】
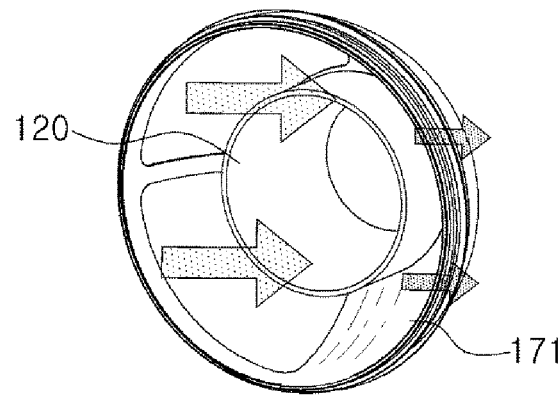
【FIG. 24C】
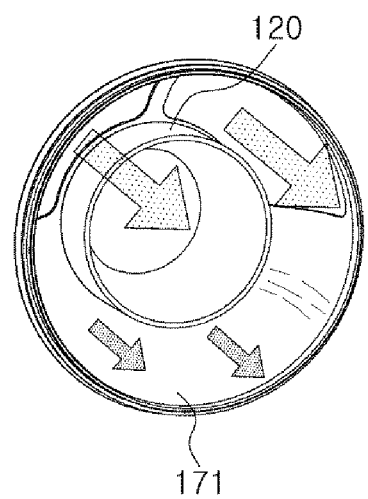
【FIG. 24D】
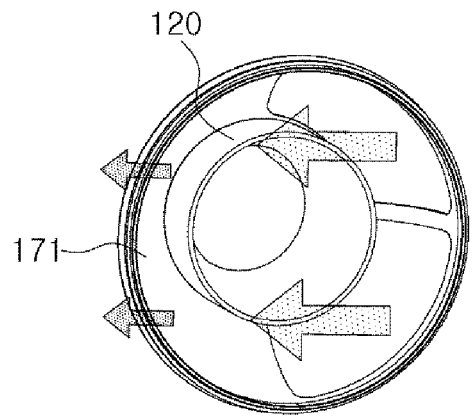

[FIG. 25]
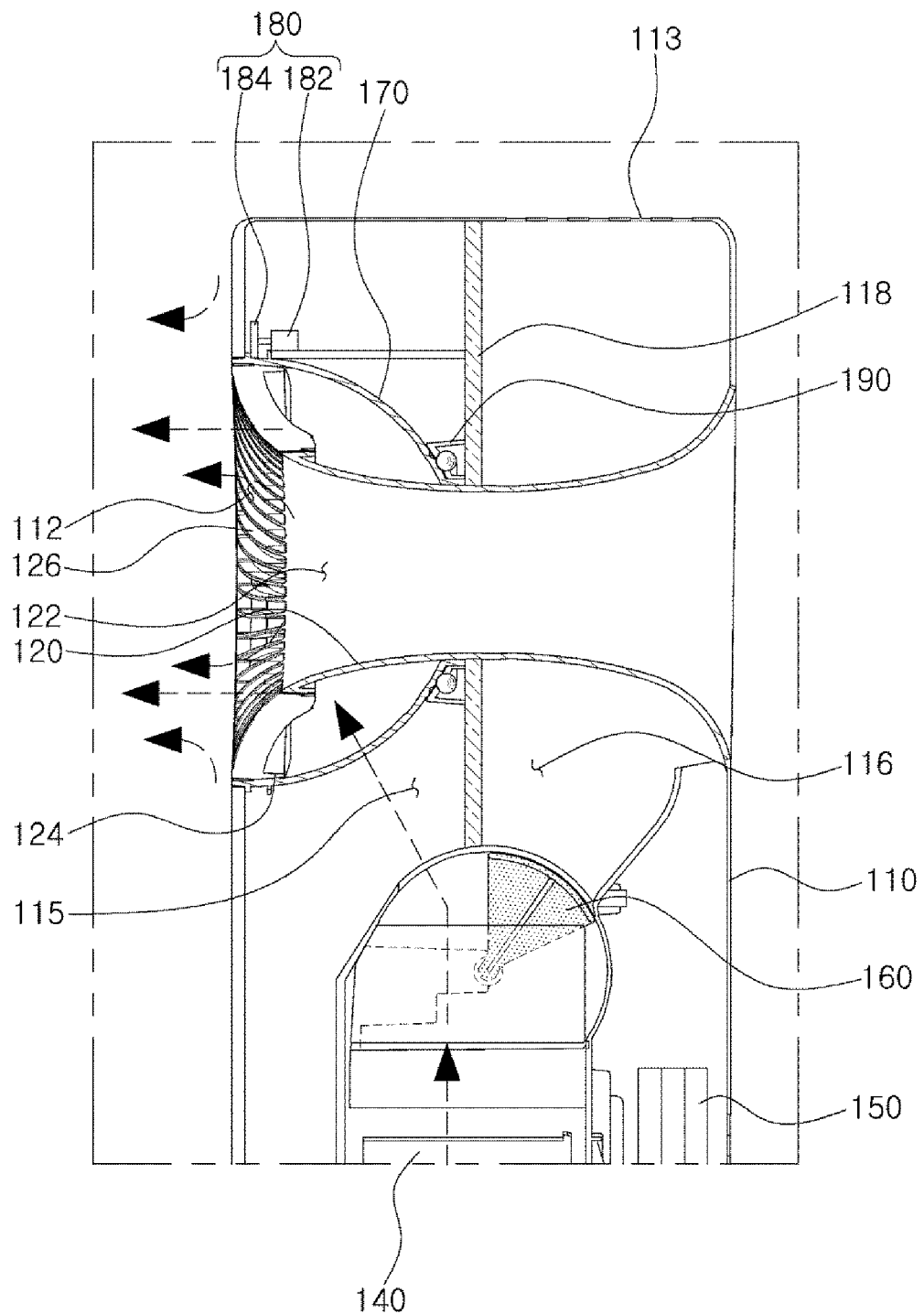

[FIG. 26]
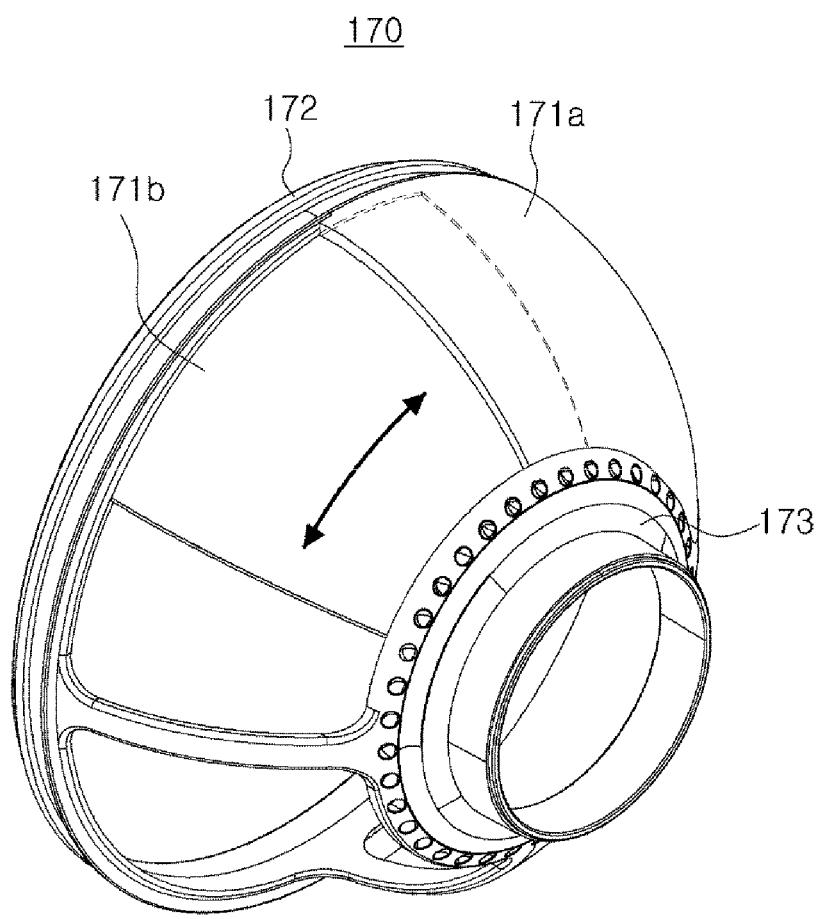

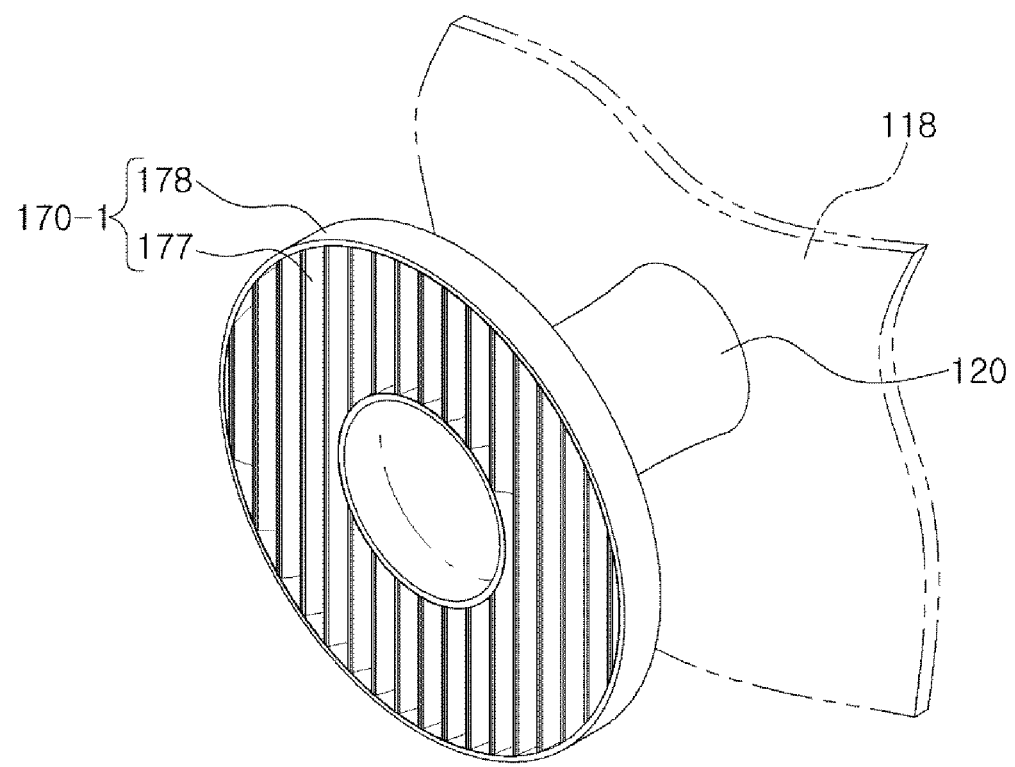
[FIG. 27]

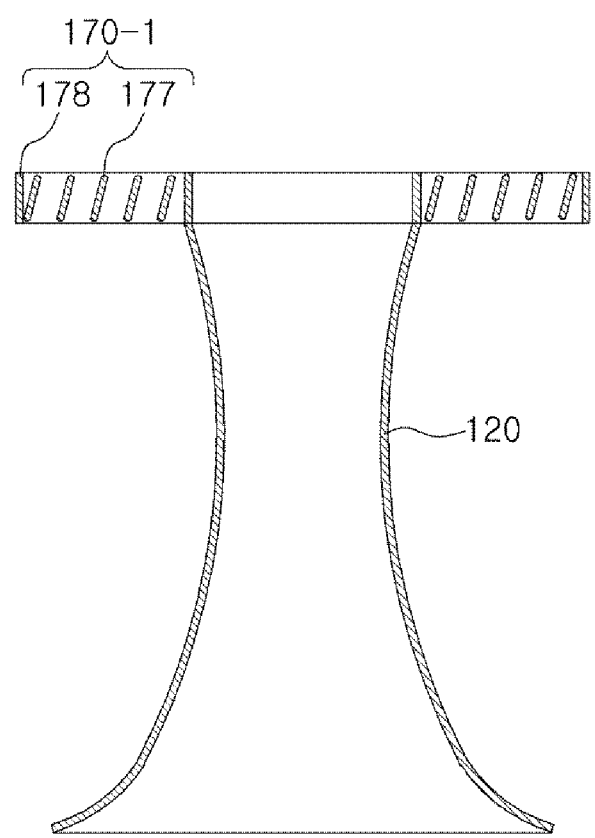
[FIG. 28]

[FIG. 29]
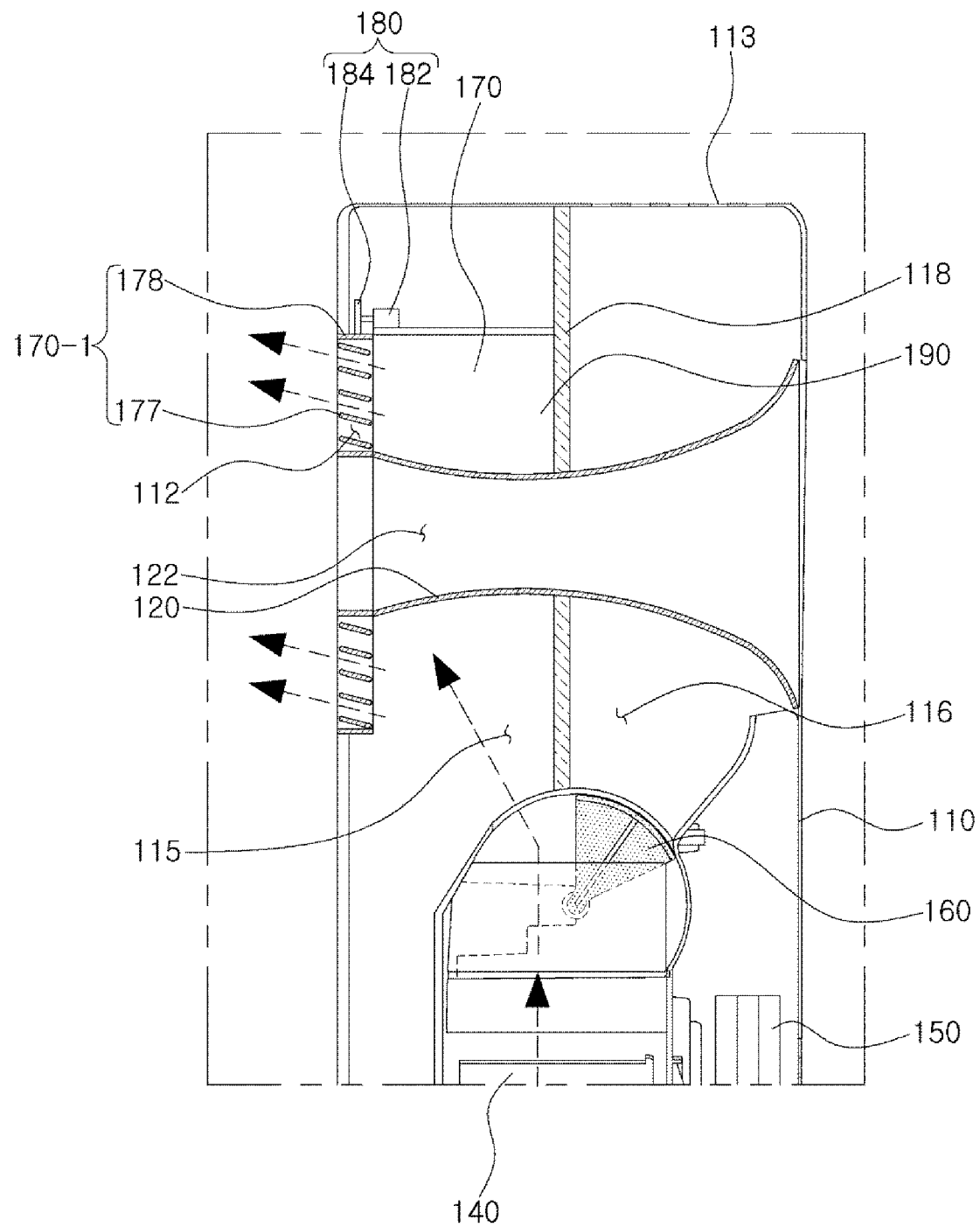

WIND-DIRECTION ADJUSTABLE AIR PURIFIER

CROSS REFERENCE TO RELATED APPLICATIONS

This application is the U.S. National Stage entry of International Application Number PCT/KR2017/014269 filed under the Patent Cooperation Treaty having a filing date of Dec. 7, 2017, which claims priority to Korean Patent Application Serial Number 10-2016-0166032 having a filing date of Dec. 7, 2016, and Korean Patent Application Serial Number 10-2016-0179328 having a filing date of Dec. 26, 2016, which are incorporated herein by reference.

TECHNICAL FIELD

The present disclosure relates to a wind-direction adjustable air purifier.

BACKGROUND ART

Among devices for discharging air, such as an air purifier a humidifier, a dehumidifier, an air conditioner and the like, there is a product having an annular air outlet.

An annular air outlet may be employed in consideration of a product design or may be employed to discharge discharged air in the form of a rotating stream.

However, such an annular air outlet has a disadvantage in that it is not easy to control an air stream direction in terms of a structure.

Therefore, a product having an annular air outlet according to the prior art cannot control an air stream direction of an annular air outlet.

Korean Patent Laid-Open Publication Nos. 10-2014-0093158 and 10-2015-0092067 disclose an air conditioner having an annular air outlet, and Korean Patent Laid-Open Publication Nos. 10-2014-0093158 and 10-2015-0092067 disclose an air conditioner having a structure in which an air stream direction of an annular air outlet cannot be changed as described above.

DISCLOSURE

Technical Problem

An aspect of the present disclosure is to provide a wind-direction adjustable air purifier capable of adjusting an air stream direction of an annular air discharge opening, to prevent the occurrence of at least some of the problems of the related art as described above.

Technical Solution

According to an aspect of a first embodiment of the present disclosure, a wind-direction adjustable air purifier includes a housing provided with an air discharge opening formed in one surface thereof; an air guide having a front end disposed in a center of the air discharge opening and a rear end extending toward the other surface of the housing, in such a manner that the air discharge opening has an annular shape; and a rotation guide disposed inside the housing to be coupled thereto to be rotatable in a circumferential direction of the air discharge opening, and supporting the air guide in the housing. The air guide is coupled to the rotation guide to be rotatable in a direction inclined relative to an air discharge direction of the air discharge opening.

According to another aspect of the first embodiment of the present disclosure, a wind-direction adjustable air purifier includes a housing; an air discharge opening having an annular shape, provided in the front of the housing; and an air guide having a front end disposed in a center of the air discharge opening and a rear end extending toward the back of the housing, in such a manner that the air discharge opening has an annular shape, the air guide including a hollow penetrating from the front to the back of the housing. The air guide is rotatable in a direction inclined with respect to an air discharge direction of the air discharge opening.

According to an aspect of a second embodiment of the present disclosure, a wind-direction adjustable air purifier includes a housing; an air discharge fan provided in the housing; an air discharge opening disposed in one surface of the housing; an air guide having a front end disposed in a center of the air discharge opening and a rear end extending to the other surface of the housing, in such a manner that the air discharge opening has an annular shape, to guide air flowing by the air discharge fan to the air discharge opening; and an air stream direction adjusting unit disposed inside the housing to be rotatably coupled thereto in a circumferential direction of the air guide, and changing a discharge direction of air discharged from the air discharge opening depending on a rotation position.

In this case, the air stream direction adjusting unit may include an air blocking film disposed on a flow path of air flowing toward an outer circumferential surface of the air guide while being spaced apart from the air guide, and rotating in the circumferential direction of the air guide.

The air blocking film may be configured to be adjustable in area.

The air stream direction adjusting unit may include a plurality of deflection blades, the plurality of deflection blades being disposed in the air discharge opening, having one ends deflected in one direction on the basis of a discharge direction of air discharged from the air discharge opening, and being rotatable in a circumferential direction of the air discharge opening.

Advantageous Effects

According to an embodiment of the present disclosure with the configuration as described above, an effect in which an air stream direction of an annular air discharge opening may be adjusted may be obtained.

In addition, according to another embodiment of the present disclosure, an effect in which a discharge wind direction of an annular air discharge opening may be easily confirmed at a long distance or in a dark environment.

DESCRIPTION OF DRAWINGS

FIG. 1 is a front perspective view of an air purifier according to a first embodiment and a second embodiment of the present disclosure.

FIG. 2 is a rear perspective view of the air purifier illustrated in FIG. 1.

FIGS. 3 to 15 are views related to the first embodiment of the present disclosure.

FIG. 3 is a side cross-sectional view of the air purifier illustrated in FIG. 1.

FIG. 4 is a side sectional view of the air purifier illustrated in FIG. 1, illustrating a case in which air is discharged through an upper outlet port.

FIG. 5 is a side cross-sectional view of the air purifier illustrated in FIG. 1, illustrating a case in which air is discharged through an annular air discharge opening.

FIG. 6 is a side sectional view of the air purifier illustrated in FIG. 1, illustrating a case in which air is simultaneously discharged through an annular air discharge opening and an upper outlet port.

FIGS. 7A and 7B are operation diagrams illustrating an operation of adjusting an air stream direction of an annular air discharge opening provided in the air purifier illustrated in FIG. 1.

FIG. 8 is a perspective view illustrating a coupling structure of an air guide, a rotation guide, and a rotation restricting portion included in the air purifier illustrated in FIG. 1.

FIG. 9 is an exploded perspective view of the rotation guide and the rotation restricting portion illustrated in FIG. 8.

FIG. 10 is an exploded perspective view of the air guide and the rotation guide illustrated in FIG. 8.

FIG. 11 is a perspective view illustrating a state in which the air guide illustrated in FIG. 8 is rotated in the rotation guide.

FIG. 12 is a cross-sectional perspective view partially illustrating an upper portion of the air purifier illustrated in FIG. 1.

FIG. 13 is a side cross-sectional view illustrating an operation in which the air guide included in the air purifier of FIG. 1 rotates in the rotation guide.

FIG. 14 is a perspective view of a light emitting display unit included in an air purifier according to another embodiment of the present disclosure.

FIG. 15 is a front view illustrating an operation state of the light emitting display unit illustrated in FIG. 14.

FIGS. 16 to 29 are views related to the second embodiment of the present disclosure.

FIG. 16 is a side cross-sectional view of the air purifier illustrated in FIG. 1.

FIG. 17 is a side sectional view of the air purifier illustrated in FIG. 1, illustrating a case in which air is discharged through an upper outlet port.

FIG. 18 is a side sectional view of the air purifier illustrated in FIG. 1, illustrating a case in which air is discharged through an annular air discharge opening.

FIG. 19 is a side cross-sectional view of the air purifier illustrated in FIG. 1, illustrating a case in which air is simultaneously discharged through the annular air discharge opening and the upper outlet port.

FIG. 20 is a perspective view illustrating a coupling structure of an air guide, an air stream direction adjusting portion, and a rotation restricting portion included in the air purifier illustrated in FIG. 1.

FIG. 21 is an exploded perspective view of the air stream direction adjusting portion and the rotation restricting portion illustrated in FIG. 20.

FIG. 22 is an exploded perspective view of the air guide and the air stream direction adjusting portion illustrated in FIG. 21.

FIG. 23 is a perspective view of the air stream direction adjusting portion.

FIGS. 24A to 24D are views illustrating wind direction adjusting operations of the air stream direction adjusting portion.

FIG. 25 is a side cross-sectional view illustrating a driving unit automatically rotating the air stream direction adjusting portion.

FIG. 26 is a perspective view illustrating another embodiment of an air blocking film included in the air stream direction adjusting portion.

FIG. 27 is a perspective view of an air stream direction adjusting portion included in an air purifier according to another embodiment of the present disclosure.

FIG. 28 is a cross-sectional view of the air stream direction adjusting portion illustrated in FIG. 27.

FIG. 29 is a side cross-sectional view of the air purifier in which the air stream direction adjusting portion illustrated in FIG. 27 is installed.

BEST MODE

The terminology used herein is for the purpose of describing particular embodiments only and is not intended to be limiting of the invention. Furthermore, the singular forms in this specification include plural expressions unless the context clearly dictates otherwise.

The wind-direction adjustable air purifier of the present disclosure includes two embodiments, and is divided into the first and second embodiments. FIGS. 1 and 2 illustrate shapes of an outer surface common to both the first embodiment and the second embodiment, FIGS. 3 to 15 illustrate the drawings related to the first embodiment of the present disclosure, and FIGS. 16 to 29 are drawings related to the second embodiment of the present disclosure.

Even when reference numerals of the first embodiment illustrated in FIGS. 3 to 15 and reference numerals of the second embodiment illustrated in FIGS. 16 to 29 are denoted by the same reference numerals, the description will be made on the assumption that they are different from each other.

First Embodiment

Hereinafter, a first embodiment of the present disclosure will be described with reference to FIGS. 1 to 15.

First, the configuration and overall structure of an air purifier 100 according to an embodiment of the present disclosure and the flow path switching operation will be described with reference to FIGS. 1 to 6.

As illustrated in FIGS. 1 to 6, the air purifier 100 according to an embodiment of the present disclosure may include a housing 110, an air guide 120, an air hole 130, an air discharge fan 140, an air purifying filter 150, and a flow path switching unit 160.

The housing 110 may constitute an external appearance of the air purifier 100 according to an embodiment of the present disclosure, and may be provided with an air inlet port 111 through which external air flows into the housing 110, an air discharge opening 112 in the front thereof, and an upper outlet port 113 on an upper end thereof.

The air discharge opening 112 and the upper outlet port 113 may constitute a passage through which air drawn into the housing 110 is discharged to the outside of the housing 110.

In this case, the air discharge opening 112 may be formed in an annular shape due to the air guide 120 to be described later.

In addition, in an embodiment, the air inlet port 111 may be formed in the back of the housing 110, but the position thereof is not limited thereto. The air inlet port may also be formed in at least one of the front, a side surface, and the back of the housing 110.

In addition, a partition wall 118 may be provided in the housing 110 to separate the air discharge opening 112 and the upper outlet port 113.

The partition wall 118 extends from the upper outlet port 113 in a direction toward the air discharge fan 140, to form a front discharge passage 115 connected between the air discharge fan 140 and the air discharge opening 112 and an upper discharge passage 116 connected between the air discharge fan 140 and the upper outlet port 113, inside the housing 110.

The air guide 120 is disposed inside the housing 110, and has a front end disposed in a central portion of the air discharge opening 112 and a rear end extending toward the other surface of the housing 110, in such a manner that the air discharge opening 112 has an annular shape.

The air guide 120 as described above may be disposed in the front discharge passage 115 inside the housing 110 to guide the air flowing in the front discharge passage 115 to the air discharge opening 112.

In an embodiment, the air guide 120 may be configured to have a cylindrical shape, while having a hollow 122 penetrating from the front of the housing 110 to the back thereof.

Also, in an embodiment, the air guide 120 may communicate with the air hole 130 to be described later to form a portion of a hole penetrating through the housing 110 from the front to the back thereof, but the present disclosure is not limited thereto. The rear end of the air guide 120 may also be shielded by the partition wall 118.

On the other hand, in an embodiment, the partition wall 118 may be provided with an enclosure 119, surrounding an upper half of the air guide 120 at an interval, to guide the air flowing upwardly of the air guide 120 to the air discharge opening 112, and extending toward the air discharge opening 112.

The air hole 130 is formed in the housing 110 and communicates with the hollow 122 of the air guide 120 to extend to the back of the housing 110. To this end, a cylindrical or trumpet-shaped structure forming the air hole 130 may be formed to traverse the upper discharge passage 116 in the interior of the housing 110.

On the other hand, a hole penetrating from the front to the back of the housing 110 may be formed in the housing 110 as the hollow 122 of the air guide 120 and the air hole 130 are connected to each other.

In this structure, when air is discharged through the air discharge opening 112, the air pressure around the air discharge opening 112 is reduced, and thus, the air in the back of the housing 110 may join the air discharged from the air discharge opening 112 to flow toward the front of the housing 110 through the hollow 122 of the air guide 120 and the air hole 130.

Therefore, in the case of the air purifier 100 according to an embodiment of the present disclosure, for example, when air is discharged to the air discharge opening 112 having an annular shape, a flow may be generated in the ambient air of the air discharge opening 112, and as a result, the air discharge amount may increase as illustrated in FIGS. 5 and 6.

The air discharge fan 140 is provided inside the housing 110 and draws air from the outside of the housing 110 through the air inlet port 111 in operation and then discharges the air to the air discharge opening 112 or the upper outlet port 113.

In an embodiment, the air discharge fan may be a centrifugal fan disposed in an entrance side of the front discharge passage 115 and the upper discharge passage 116 as illustrated in FIGS. 3 to 6, but the configuration thereof is not limited thereto. The position and type of the air discharge fan 140 may be changed.

The air purifying filter 150 is provided between the air inlet port 111 and the air discharge fan 140 to purify air drawn into the air inlet port 111.

In an example, the air purifying filter 150 may be configured to include a prefilter, a deodorizing filter, a sterilizing filter, an activated carbon filter, a HEPA filter, and the like.

In addition, although not illustrated, the air purifier 100 according to an embodiment of the present disclosure may also include a humidifying filter for humidifying air between the air purifying filter 150 and the air discharge fan 140, or a dehumidifying unit for dehumidifying air.

The flow path switching unit 160 may guide air discharged by the air discharge fan 140 to at least one of the air discharge opening 112 and the upper outlet port 113.

In an embodiment, the flow path switching unit 160 may be provided inside the housing 110 to open and close the front discharge passage 115 and the upper discharge passage 116.

For example, the flow path switching unit 160 may be configured to selectively open or close the front discharge passage 115 and the upper discharge passage 116 by rotating as illustrated in FIGS. 2 to 6, but the configuration thereof is not limited thereto.

On the other hand, in a case which the flow path switching unit 160 closes the front discharge passage 115 and opens the upper discharge passage 116 as illustrated in FIG. 4, the air discharged by the air discharge fan 140 may be discharged to the upper outlet port 113.

Further, in a case which the flow path switching unit 160 opens the front discharge passage 115 and closes the upper discharge passage 116 as illustrated in FIG. 5, the air discharged by the air discharge fan 140 may be discharged to the air discharge opening 112 having an annular shape.

As illustrated in FIG. 6, in a case in which the front discharge passage 115 and the upper discharge passage 116 are both opened by the flow path switching unit 160, a portion of the air discharged by the air discharge fan 140 is discharged to the upper outlet port 113 and the remainder may be discharged to the air discharge opening 112.

Next, with reference to FIGS. 7A to 13, an air stream direction adjusting structure of the air discharge opening 112 having an annular shape will be described.

The air purifier 100 according to an embodiment of the present disclosure may be configured in such a manner that the air guide 120 may rotate in a direction inclined with respect to an air discharge direction of the air discharge opening 112.

As described above, in the case in which the air guide 120 is rotated to be inclined with respect to the air discharge direction, the air discharged to the air discharge opening 112 along an outer circumferential surface of the air guide 120 may be discharged in a direction toward a front end of the air guide 120.

To implement such an operation, the air purifier 100 according to an embodiment of the present disclosure may include a rotation guide 170 and a rotation restricting portion 190 as illustrated in FIGS. 7A to 13.

The rotation guide 170 is coupled to the inside of the housing 110 and may support the air guide 120 in the housing 110. For example, the rotation guide 170 may function as a medium for coupling the air guide 120 to the housing 110.

The rotation guide 170 as described above may be coupled to the housing 110 to be rotatable in the circumferential direction of the air discharge opening 112.

Thus, the air guide 120 coupled to the rotation guide 170 may also be rotated in the circumferential direction of the air discharge opening 112 in accordance with the rotation of the rotation guide 170.

Further, in an embodiment, the air guide 120 may be coupled to the rotation guide 170 to be rotatable in a direction inclined with respect to the air discharge direction of the air discharge opening 112.

For example, the air guide 120 may be coupled to the rotation guide 170 to be rotatable upwardly and downwardly. In this case, when the rotation guide 170 is rotated in the circumferential direction of the air discharge opening 112, the air guide 120 is also rotated in the circumferential direction of the air discharge opening 112 according to the rotation of the rotation guide 170. As a result, the air guide 120 may be rotated to the right or left or may be rotated in a diagonal direction, depending on an arrangement position of a coupled portion of the air guide 120 and the rotation guide 170, in the rotation guide 170.

Through the rotation structure of the rotation guide 170 and the air guide 120, the air guide 120 may be rotated in a free direction within the range of the air discharge opening 112.

A specific structure of the air guide 120 and the rotation guide 170 to implement such operation will be described.

In an embodiment, the air guide 120 is provided with a rim portion 124 formed on a front end thereof, the rim portion having an annular shape corresponding to a shape of the air discharge opening 112 and being disposed in the air discharge opening 112. The air guide 120 is also provided with a plurality of guide blades 126 connected between the rim portion 124 and the air guide 120, along an edge of the air guide 120.

With this structure, the plurality of guide blades 126 may be disposed in the air discharge opening 112 having an annular shape, and the air discharged through the air discharge opening 112 is discharged through space between the plurality of guide blades 126.

In an embodiment, the guide blades 126 are formed in an inclined or curved shape in the circumferential direction of the air discharge opening 112 as illustrated in FIGS. 7A and 7B and FIG. 8, such that the air discharged through the air discharge opening 112 may be discharged in the form of a whirl.

For reference, an air stream in the form of rotating air stream has an advantage in that a room air circulation performance is relatively high since a reach distance of the air is longer than an air stream in the form of straight line.

On the other hand, in an embodiment, the rotation guide 170 may be composed of an annular frame 171, a rotating shaft member 172, a support frame 173, and a connection frame 178.

The annular frame 171 hermetically surrounds an outer peripheral surface of the rim portion 124 of the air guide 120 and is rotatably coupled to an outer periphery of the air discharge opening 112.

In an embodiment, an outer circumferential surface of the annular frame 171 may be rotatably coupled to a front panel of the housing 110, forming the air discharge opening 112, while maintaining airtightness.

Further, airtightness may be maintained between the annular frame 171 and the rim portion 124 when the air guide 120 rotates.

To this end, in an embodiment, the rim portion 124 is configured in such a manner that an outer peripheral surface thereof is a curved surface convex in a rotational direction of the air guide 120, and the annular frame 171 is configured in such a manner that an inner diameter of an inner surface thereof conforms to a maximum outer diameter of the rim portion 124, such that the outer peripheral surface of the rim portion 124 and the inner surface of the annular frame 171 may be brought into close contact with each other when the air guide 120 rotates.

For example, the curvature of the curved surface formed on the outer peripheral surface of the rim portion 124 may correspond to the curvature of a circle having a radius from the center of the air discharge opening 112 to the inner surface of the annular frame 171, but is not limited thereto.

The rotating shaft member 172 may rotatably couple the rim portion 124 to the annular frame 171. In an embodiment, the rotating shaft member 172 may be provided as one pair to be disposed in symmetrical positions on both ends of the annular frame 171.

This rotating shaft member 172 may fasten the rim portion 124 to the annular frame 171, in such a manner that the rim portion 124 and the air guide 120 are rotatable relative to the annular frame 171 as illustrated in FIG. 11.

The support frame 173 is a member which is supported on the partition wall 118 provided inside the housing 110 to be rotatable in a circumferential direction of the air discharge opening 112 and which contacts a rear end of the air guide 120.

In this structure, when the air guide 120 is rotated in the annular frame 171, the rear end of the air guide 120 may slide on the surface of the support frame 173 while being in contact with the support frame 173.

In this case, a contact portion between the support frame 173 and the rear end of the air guide 120 may be configured to maintain airtightness when the air guide 120 rotates.

To this end, a contacted surface 173a of the support frame 173 contacting the rear end of the air guide 120 may be formed as a curved surface conforming to a turning locus of the rear end of the air guide 120 when the air guide 120 is rotated.

Thus, the contacted surface 173a may be brought into contact with the rear end of the air guide 120 on the entire circumferential surface of the hollow 122 when the air guide 120 is rotated.

In an example, since the air guide 120 rotates around the rotating shaft member 172, the contacted surface 173a of the support frame 173 may be formed as a curved surface, curved depending on the curvature of a circle or a sphere of which a distance from a center of a virtual straight line connecting the rotating shaft members 172 on both sides of the air guide 120 to the rear end of the air guide 120 is a radius.

In addition, in an example, a cover member 180 to be described later may cover the outer peripheral surface of the air guide 12G. In this case, a portion contacting the contacted surface 173a of the support frame 173 is a contact surface 182 formed on a rear end of the cover member 180.

On the other hand, in the case in which the air purifier 100 according to an embodiment of the present disclosure has a hole penetrating from the front to the rear as described above, the support frame 173 may be provided with a through hole 174, communicating the hollow 122 of the air guide 120 with the air hole 130 of the housing 110.

The connection frame 178 may connect the annular frame 171 and the support frame 173 to each other to match the rotational, behavior of the annular frame 171 and the support frame 173.

In an embodiment, the connection frame 178 may be provided as a plurality of connection frames 178, which are disposed along the peripheries of the annular frame 171 and the support frame 173 and have a relatively reduced thickness while being disposed to have a relatively wide interval therebetween, such that interference with air flowing from the front discharge passage 115 to the air discharge opening 112 may be significantly reduced.

On the other hand, in an embodiment, the hollow 122 of the air guide 120 and the air hole 130 of the housing 110 may be maintained in a communicating state with respect to each other at all times to allow for flow of air even at any rotational angle of the air guide 120 when the air guide 120 rotates.

To this end, the air guide 120 may be configured to rotate within a range in which the hollow 122 and the air hole 130 communicate with each other. For example, the air guide 120 may be rotated within a range in which the hollow 122 and the air hole 130 overlap at least partially.

Therefore, even when the air guide 120 is rotated to adjust an air stream direction, the air in the back of the housing 110 joins the air discharged from the air discharge opening 112 through the air hole 130 and the hollow 122.

Although not illustrated, to limit a rotation angle of the air guide 120, a stopper structure (not illustrated) may be provided on the rotating shaft member 172 or the rotation guide 170, to restrict the rotation of the air guide 120 at a predetermined rotation angle or more.

On the other hand, if the air guide 120 is formed to have a cylindrical shape with a relatively reduced thickness, and in a case in which the air guide 120 is rotated by a predetermined angle or more, a portion of a rear end of the air guide 120 may be disposed in the through hole 174 of the support frame 173. In this case, airtightness between the air guide 120 and the support frame 173 may not be maintained, causing leakage of a portion of air flowing to the front discharge passage 115, to the air hole 130 through a gap between the air guide 120 and the support frame 173.

Therefore, to secure a rotation angle of the air guide 120 to adjust an air stream direction, while maintaining the airtight ness between the outside of the air guide 120 and the air hole 130 when the air guide 120 is rotated, the cover member 180, increasing a thickness of the rear end of the air guide 120, may be coupled to the outer peripheral surface of the air guide 120 in an example.

The cover member 180 may be configured to have the contact surface 182 having a thickness equal to or greater than the predetermined thickness such that a rear end of the cover member 180 has the same curvature as that of the contacted surface 173a of the support frame 173 and is in surface contact to correspond to the predetermined thickness with the support frame 173, and may be configured to have a cylindrical shape surrounding the outer peripheral surface of the air guide 120.

In this configuration, the air guide 120 may be rotated by the thickness of the contact surface 182 of the cover member 130 in the rotation guide 170 as illustrated in FIG. 13.

The rotation restricting portion 190 may restrict rotation of the rotation guide 170 in the housing 110 such that a rotation-adjusted position of the rotation guide 170 is maintained. For example, the rotation guide 170 is rotationally restricted by the rotation restricting portion 190 such that the rotated position of the rotation guide 170 adjusted by a user may be prevented from being changed by wind pressure of the air discharged to the air discharge opening 112 or by vibrations generated in the housing 110.

In an embodiment, the rotation restricting portion 190 may be configured to be fixed to the partition wall 118 and to restrict rotational behavior of the support frame 173 of the rotation guide 170.

In an example to implement such operations, as illustrated in FIG. 9, the rotation restricting portion 190 may include a raceway member 192, which is fixed to the partition wall 118 and on which a surface opposite to the contacted surface 173a of the support frame 173 slides, and a ball member 194 partially protruding on a surface of the raceway member 192.

In this case, a plurality of grooves 175 may be formed in the opposite surface of the contacted surface 173a of the support frame 173 in a circumferential direction of the support frame 173, such that protruding portions of the ball members 194 may be received in the grooves.

When the rotation guide 170 is rotated by a user, the rotation restricting portion 190 having the configuration as described above rotates while the ball member 194 is in contact with the support frame 173, to reduce frictional force during the rotation of the rotation guide 170, and when the rotation of the rotation guide 170 is stepped, the ball member 194 is received in the groove 175 formed in the support frame 173 in the position in which the rotation guide 170 is rotated, to restrict rotational behavior of the support frame 173.

However, the rotation restricting portion 190 is not limited to the structure for restricting the rotational behavior of the support frame 173 as described above, and may also be configured to restrict rotational behavior of the annular frame 171.

In the air stream direction adjusting structure of the annular air discharge opening 112 as described above, the air guide 120 is rotatably coupled to the rotation guide 170 in both directions, and the rotation guide 170 is rotationally coupled to the air discharge opening in the circumferential direction of the air discharge opening 112 in the housing. Thus, the air guide 120 may be rotated in a free direction within the range of the air discharge opening 112 to control the air stream direction of the discharged air.

For example, FIG. 7A illustrates a state in which the air guide 120 is rotated to be inclined downwardly. FIG. 73 illustrates a state in which the air guide 120 is rotated to be inclined to the right.

As illustrated in FIG. 7A, to rotate the air guide 120 to be inclined downwardly, the rotation guide 170 is rotated in such a manner that the rotating shaft member 172 of the air guide 120 is disposed on the left and right sides, and the air guide 120 is rotated downwardly with respect to the rotation guide 170.

In addition, as illustrated in FIG. 7B, to rotate the air guide 120 in a rightward inclined direction, the rotation guide 170 is rotated in such a manner that the rotating shaft member 172 of the air guide 120 is disposed on the upper side and the lower side, and the air guide 120 is rotated to the right with respect to the rotation guide 170.

Finally, referring to FIGS. 14 and 15, an air purifier 100 according to another embodiment of the present disclosure will be described.

As illustrated in FIGS. 14 and 15, the air purifier 100 according to another embodiment of the present disclosure may further include a light emitting display unit 200 that displays light visible with the naked eyes, through the hollow 122 of the air guide 120 from the outside of the housing 110.

The light emitting display unit 200 is provided on the support frame 173 or the partition wall 118. In a case in which the air guide 120 is rotated obliquely in the rotation guide 170, a portion of the light emitting display unit 200 may be exposed externally of the housing 110.

In an embodiment, the light emitting display unit 200 may include an illumination module 202 coupled to the partition wall 118 to receive electric power and having a hollow hole communicating with the hollow 122 of the air guide 120 and the air hole 130 of the housing 110, and an annular lens 205 provided on an edge of the hollow hole 203 to diffuse light emitted from the illumination module 202.

In an example, the light emitting display unit 200 may be integrally formed with the rotation restricting portion 190 fixed to the partition wall 118 as illustrated in FIG. 14, but the configuration thereof is not limited thereto.

The light emitting display unit 200 as described above is configured in such a manner that different portions of the light emitting display unit 200 are exposed to the hollow 122 of the air guide 120 depending on a rotation direction of the air guide 120, so that a user may check an air stream direction of the air purifier 100 in a distant or dark environment.

For example, in a case in which the air guide 120 is rotated upwardly as illustrated in FIG. 15, since the rear end of the air guide 120 is relatively lowered, a lower side of the annular lens 205 may be exposed through the hollow 122 of the air guide 120. In this case, the user may grasp the rotating direction of the air guide 120 through the exposed portion of the annular lens 205.

Second Embodiment

Hereinafter, a second embodiment of the present disclosure will be described with reference to FIGS. 1, 2 and 16 to 29.

As described above, although the reference numerals in the second embodiment illustrated in FIGS. 16 to 29 denote the same reference numerals as those denoted in the first embodiment illustrated in FIGS. 3 to 15, the reference numerals are reference numerals indicating other embodiments.

First, with reference to FIGS. 1, 2 and 16 to 19, the configuration and overall structure of an air purifier 100 according to an embodiment of the present disclosure and a flow path switching operation will be described.

As illustrated in FIGS. 1, 2 and 16 to 19, the air purifier 100 according to an embodiment of the present disclosure may include a housing 110, an air guide 120, an air hole 130, an air discharge fan 140, an air purifying filter 150, and a flow path switching unit 160.

The housing 110 may constitute an external appearance of the air purifier 100 according to an embodiment of the present disclosure, and may be provided with an air inlet port 111 through which external air flows into the housing 110, an air discharge opening 112 in the front thereof, and an upper outlet port 113 on an upper end thereof.

The air discharge opening 112 and the upper cutlet port 113 may constitute a passage through which air drawn into the housing 110 is discharged to the outside of the housing 110.

In this case, the air discharge opening 112 may be formed in an annular shape due to the air guide 120 to be described later.

In addition, in an embodiment, the air inlet port 111 may be formed in the back of the housing 110, but the position thereof is not limited thereto. The air inlet port may also be formed in the front or a side surface of the housing 110.

In addition, a partition wall 118 may be provided in the housing 110 to separate the air discharge opening 112 and the upper outlet port 113.

The partition wall 118 extends from the upper outlet port 113 in a direction toward the air discharge fan 140, to form a front discharge passage 115 connected between the air discharge fan 140 and the air discharge opening 112 and an upper discharge passage 116 connected between the air discharge fan 140 and the upper outlet port 113, inside the housing 110.

The air guide 120 is disposed inside the housing 110, and has a front end disposed in a central portion of the air discharge opening 112 and a rear end extending toward the back of the housing 110, in such a manner that the air discharge opening 112 has an annular shape.

The air guide 120 as described above may be disposed in the front discharge passage 115 inside the housing 110 to guide the air flowing in the front discharge passage 115 to the air discharge opening 112.

In an embodiment, the air guide 120 may be configured to have a cylindrical shape, while having a hollow 122 penetrating from the front of the housing 110 to the back thereof.

Through the structure of the air guide 120 as described above, a hole may be formed to penetrate from the center of the air discharge opening 112 to the back of the housing 110 in the housing 110.

The hole formed in the center of the air discharge opening 112 of the housing 110 has an effect of increasing the air volume of the air discharged from the air discharge opening 112.

In detail, when air is discharged through the air discharge opening 112 having an annular shape, air pressure around the air discharge opening 112 is reduced as illustrated in FIGS. 18 and 19, and thus, an air flow is generated in the hollow 122 of the air guide 120 toward the front of the housing 110, such that the air in the back of the housing 110 joins the air discharged from the air discharge opening 112 to flow to the front of the housing 110.

As a result, the air volume of air discharged from the air discharge opening 112 increases.

On the other hand, in an embodiment, the partition wall 118 is provided with an enclosure 119 having an arc shape, surrounding an upper half of the air guide 120 at an interval from the air guide 120 to guide the air flowing to the upper portion of the air guide 120 to the air discharge opening 112, and extending in a direction toward the air discharge opening 112.

In addition, in an embodiment, the air guide 120 is provided with a rim portion 124 formed on a front end thereof, the rim portion having an annular shape corresponding to a shape of the air discharge opening 112 and being disposed in the air discharge opening 112. The air guide 120 is also provided with a plurality of guide blades 126 connected between the rim portion 124 and the air guide 120, along an edge of the air guide 120.

In the case in which the air guide 120 having such a structure is coupled to the air discharge opening 112, a plurality of guide blades 126 may be disposed in the air discharge opening 112 having an annular shape, and the air discharged to the air discharge opening 112 may be discharged to a space between the plurality of guide blades 126.

In an embodiment, the guide blades 126 are formed in an inclined or curved shape in the circumferential direction of the air discharge opening 112 as illustrated in FIG. 1, such that the air discharged through the air discharge opening 112 may be discharged in the form of a whirl.

For reference, an air stream in the form of rotating air stream has relatively strong linearity as compared with an air stream in the form of straight line, and thus, a reach distance of the air is relatively long, to have an advantage in that a room air circulation performance is relatively high.

The air discharge fan 140 is provided inside the housing 110 and draws air outside the housing 110 through the air inlet port 111 in operation and then discharges the air to the air discharge opening 112 or the upper outlet port 113.

In an embodiment, the air discharge fan 140 may be configured as a centrifugal fan disposed in an entrance side of the front discharge passage 115 and the upper discharge passage 116 as illustrated in FIGS. 16 to 19, but the configuration thereof is not limited thereto. The position and type of the air discharge fan 140 may be changed.

The air purifying filter 150 is provided between the air inlet port 111 and the air discharge fan 140 to purify air drawn into the air inlet port 111.

In an example, the air purifying filter 150 may be configured to include a prefilter, a deodorizing filter, a sterilizing filter, an activated carbon filter, a HEPA filter, and the like.

In addition, although not illustrated, the air purifier 100 according to an embodiment of the present disclosure may also include a humidifying filter for humidifying air between the air purifying filter 150 and the air discharge fan 140, or a dehumidifying unit for dehumidifying air.

The flow path switching unit 160 may guide air discharged by the air discharge fan 140 to at least one of the air discharge opening 112 and the upper outlet port 113.

In an embodiment, the flow path switching unit 160 may be provided inside the housing 110 to open and close the front discharge passage 115 and the upper discharge passage 116.

For example, the flow path switching unit 160 may be configured to selectively open or close the front discharge passage 115 and the upper discharge passage 116 by rotating as illustrated in FIGS. 2 and 16 to 19, but the configuration thereof is not limited thereto.

On the other hand, in a case which the flow path switching unit 160 closes the front discharge passage 115 and opens the upper discharge passage 116 as illustrated in FIG. 17, the air discharged by the air discharge fan 140 may be discharged to the upper outlet port 113.

Further, in a case which the flow path switching unit 160 opens the front discharge passage 115 and closes the upper discharge passage 116 as illustrated in FIG. 18, the air discharged by the air discharge fan 140 may be discharged to the air discharge opening 112 having an annular shape.

As illustrated in FIG. 19, in a case in which the front discharge passage 115 and the upper discharge passage 116 are both opened by the flow path switching unit 160, a portion of the air discharged by the air discharge fan 140 is discharged to the upper outlet port 113 and the remainder may be discharged to the air discharge opening 112.

On the other hand, the air purifier 100 having the configuration as described above according to an embodiment of the present disclosure may adjust an air stream direction of the air discharged from the air discharge opening 112 having an annular shape.

To this end, the air purifier 100 according to an embodiment of the present disclosure includes an air stream direction adjusting unit 170 or 170-1.

The air stream direction adjusting unit 170 or 170-1 is disposed inside the housing 110 to be rotatably coupled thereto in the circumferential direction of the air guide 120, and may adjust a direction of air discharged from the air discharge opening 112 depending on a rotational position thereof.

Hereinafter, with reference to FIGS. 20 to 29, embodiments of the air stream direction adjusting units 170 and 170-1 will be described in detail.

First, with reference to FIGS. 20 to 25, an embodiment of the air stream direction adjusting unit 170 will be described.

As illustrated in FIGS. 20 to 25, in an embodiment, the air stream direction adjusting unit 170 may include an air blocking film 171, an annular frame 172, a support frame 173, a connection frame 175, a rotation restricting portion 190, and a driving unit 180.

The air blocking film 171 is disposed on a flow path of air flowing toward the outer circumferential surface of the air guide 120, while being spaced apart from the air guide 120, to block air flowing toward the outer circumferential surface of the air guide 120. In addition, the air blocking film 171 may be rotated in the circumferential direction of the air guide 120.

In this structure, the air blocking film 171 covers a portion of the circumference of the air guide 120, such that a portion of the air flowing toward the outer circumferential surface of the air guide 120 does not directly flow to the outer circumferential surface of the air guide 120, but may be bypassed.

Thus, in the circumference of the air guide 120, air pressure in a direction in which the air blocking film 171 is disposed is relatively low, and air pressure in a direction in which the air blocking film 171 is not disposed is relatively high.

Accordingly, as illustrated in FIG. 23, the air discharged from the air discharge opening 112 is discharged by being deflected toward the low air pressure side from the side on which the air pressure is high.

In this case, FIG. 23A illustrates an operation in which the air blocking film 171 is disposed on an upper portion of the air discharge opening 112 and the air is discharged upwardly from the air discharge opening 112. FIG. 23B illustrates an operation in which the air blocking film 171 is disposed to the left of the air discharge opening 112 and the air is discharged from the air discharge opening 112 to the left side. FIG. 23C illustrates an operation in which the air blocking film 171 is disposed on a lower portion of the air discharge opening 112 and the air is discharged downwardly from the air discharge opening 112. FIG. 23D illustrates an operation in which the air blocking film 171 is disposed to the right of the air discharge opening 112 and air is discharged from the air discharge opening 112 to the right side.

The annular frame 172 is rotatably coupled to the outer periphery of the air discharge opening 112 in the circumferential direction, and the air blocking film 171 may be coupled thereto to have matching behavior.

In an embodiment, the annular frame 172 may be configured to be rotatable with airtightly surrounding an outer circumferential surface of the rim portion 124 of the air guide 120.

The support frame 173 may be rotatably supported on the partition wall 118 provided in the housing 110 in the circumferential direction. In an embodiment, the support frame 173 may be configured in an annular shape surrounding the outer circumferential surface of the air guide 120.

On the other hand, the air blocking film 171 may be coupled between the annular frame 172 and the support frame 173. Therefore, the annular frame 172, the support frame 173, and the air blocking film 171 may rotate integrally.

The connection frame 175 may connect the annular frame 172 and the support frame 173 to each other to match the rotational behavior of the annular frame 172 and the support frame 173. The connection frame 175 as described above may be formed to have a relatively reduced thickness, to significantly reduce interference with the air flowing in the front discharge passage 115 to the air discharge opening 112.

The rotation restricting portion 190 may restrict the rotation of the air stream direction adjusting unit 170 in the housing 110 such that an adjusted rotation position of the air stream direction adjusting unit 170 is maintained. For example, the rotation restricting portion 190 may restrict the rotation of the air stream direction adjusting unit 170 in the housing 110, in such a manner that the rotation position of the air stream direction adjusting unit 170, which is adjusted by a user, is prevented from being changed by wind pressure of the air discharged to the air discharge opening 112 or by vibrations generated in the housing 110.

In an embodiment, the rotation restricting portion 190 may be configured to be fixed to the partition wall 118 and to restrict rotational behavior of the support frame 173.

In an example to implement such operations, as illustrated in FIG. 21, the rotation restricting portion 190 may include a raceway member 192, which is fixed to the partition wall 118, and on which a rear surface of the support frame 173 slides, and a ball member 194 partially protruding on a surface of the raceway member 192.

In this case, a plurality of grooves 175 may be formed in the rear surface of the support frame 173 in a circumferential direction of the support frame 173, such that protruding portions of the ball members 194 may be received in the grooves.

In the case of the rotation restricting portion 190 having the configuration as described above, when the annular frame 172 and the support frame 173 are rotated by a user, the rotation restricting portion 190 rotates in a state in which the ball member 194 is in contact with the rear surface of the support frame 173, to reduce frictional force during the rotation of the support frame 173, and when the rotation of the support frame 173 is stopped, the ball member 194 is received in the grooves 175 in the position in which the support frame 173 is rotated, to restrict rotational behavior of the support frame 173.

However, the rotation restricting portion 190 is not limited to the structure for restricting the rotational behavior of the support frame 173 as described above, and may also be configured to restrict rotational behavior of the annular frame 172.

The driving unit 180 is provided inside the housing 110 and may rotate the annular frame 172 or the support frame 173 in the circumferential direction.

The driving unit 180 as described above is provided to automatically implement the air stream direction adjustment operation of the air purifier 100 according to an embodiment of the present disclosure. However, the air stream direction adjusting unit 170 may not be automatically rotated by the driving unit 180 but may also be manually rotated by a user's hand. For example, a handle (not illustrated) for manual operation of the air stream direction adjusting unit 170 may be provided on a front end of the annular frame 172 to protrude externally of the housing 110.

On the other hand, in an example, the driving unit 180 may include a motor member 182 provided inside the housing 110, and a rotating body 184 transferring rotational force of the motor member 182 to the outer peripheral surface of the annular frame 172 as illustrated in FIG. 25.

Next, another embodiment of the air blocking film 171 will foe described with reference to FIG. 26.

As illustrated in FIG. 26, the air blocking film 172 may be configured in such a manner that an area thereof is adjustable.

The area of the air blocking film 171 may be adjusted by adjusting a length of the air blocking film 171 from the front end to the rear end of the air blocking film 171 or by adjusting a width between both ends of the air blocking film 171.

In an embodiment, the air blocking film 171 may be configured to be adjustable in width in the circumferential direction of the air guide 120.

To implement this operation, in an example, the air blocking film 171 may include a plurality of movable air blocking films 171b which are slidably engaged in the circumferential direction of the annular frame 172 to be overlapped or spread out with each other. In this case, when the plurality of movable air blocking films 171b are overlapped with each other, a total area of the air blocking film 171 may be reduced, and when the plurality of movable air blocking films 171b are mutually spread out, the total area of the air blocking film 171 may be increased.

Further, in another example, the air blocking film 171 may include a stationary air blocking film 171a and a movable air blocking film 171b as illustrated in FIG. 26.

In this case, the stationary air blocking film 171a may be fixed to the annular frame 172.

The movable air blocking film 171b may be slidably coupled to the annular frame 172 in the circumferential direction to be overlapped on the stationary air blocking film 171a or be spread externally of the stationary air blocking film 171a.

In the structure in which the area of the air blocking film 171 is adjustable as described above, under the condition that the air blocking film 171 is disposed in the same direction in the air discharge opening 112 and the air discharge fan 140 is operated at the same rotational speed, since a value of difference in air pressure occurring per portions on the circumference of the air discharge opening 112 may be changed, a deflection angle of the deflected, discharged air may be additionally adjusted.

For example, in a case in which the air blocking film 171 is disposed on an upper portion of the air discharge opening 112, when the movable air blocking film 171b is overlapped on the stationary air blocking film 171a, the air pressure difference between upper and lower portions of the air discharge opening 112 may be 15 and the air may be upwardly discharged at an angle of 30 degrees. In other words, for example, when the movable air blocking film 171b is completely spread out on the stationary air blocking film 171a, the air pressure difference between upper and lower portions of the air discharge opening 112 may be 20 greater than 15, and thus, the air may be upwardly discharged at an angle of 45 degrees or higher.

Subsequently, another embodiment of the air stream direction adjusting unit, 170-1, will be described with reference to FIGS. 27 to 29.

As illustrated in FIGS. 27 to 29, in another embodiment, the air stream direction adjusting unit 170-1 may include a rotating ring frame 178 and a deflection blade 177.

The rotating ring frame 178 is a ring shaped member rotatably coupled to the outer periphery of the air inlet port 111 in a circumferential direction, and a plurality of deflection blades 177 may be coupled thereto in the inside thereof.

The deflection blade 177 is a member for guiding air discharged from the air discharge opening 112 and is configured to transverse the inside of the rotating ring frame 178 and be disposed in the air discharge opening 112 via the rotating ring frame 178.

The deflecting blade 177 may foe configured in such a manner that a tip thereof is deflected in one direction with respect to a discharge direction of the air discharged from the air discharge opening 112, thereby forming an inclined surface for guiding the air to one side.

In an embodiment, as the deflection blade 177, a plurality of deflection blades may be provided in the inside of the annular ring frame with a gap therebetween as illustrated in FIGS. 27 and 29.

In this case, air may be discharged through intervals between the plurality of deflection blades 177.

Further, the deflection blades 177 may be rotatable in the circumferential direction of the air discharge opening 112. In an embodiment, the deflection blades 177 may be rotated in the circumferential direction of the air discharge opening 112 in accordance with the rotation of the rotating ring frame 178.

In the case of the air stream direction adjusting unit 170-1 having the configuration as described above, since the plurality of deflection blades 177 guide the air in an inclined direction in the air discharge opening 112, the air stream direction of the air discharged from the discharge opening 112 may be controlled.

However, in a case in which the deflection blades 177 are fixed to the rotating ring frame 178, air may not be discharged in a horizontal direction of the front of the air discharge opening 112.

Therefore, to reduce the limitation of adjustment of an air stream direction, the deflection blades 177 may also be rotatably coupled to the rotating ring frame 178 laterally.

On the other hand, in an embodiment, the driving unit 180 may be disposed inside the housing 110 to automatically rotate the rotating ring frame 178.

While embodiments have been illustrated and described above, it will be apparent to those skilled in the art that modifications and variations could be made without departing from the scope of the present disclosure as defined by the appended claims.

The invention claimed is:
1. A wind-direction adjustable air purifier comprising:
a housing provided with an air discharge opening formed in a front surface thereof;
an air guide having a front end disposed in a center of the air discharge opening and a rear end extending toward a rear surface of the housing, in such a manner that the air discharge opening has an annular shape; and
a rotation guide disposed inside the housing to be coupled thereto to be rotatable in a circumferential direction of the air discharge opening, and supporting the air guide in the housing,
wherein the air guide is coupled to the rotation guide to be rotatable in a direction inclined relative to an air discharge direction of the air discharge opening,
wherein the air guide has a hollow penetrating from the front surface of the housing to the rear surface of the housing,
wherein the air discharge opening is disposed in the front surface of the housing, and the housing is provided with an air hole communicating with the hollow of the air guide and extending to a back of the housing,
wherein the air guide is rotated within a range in which the hollow communicates with the air hole,
wherein the rotation guide comprises:
an annular frame surrounding an outer circumferential surface of a rim portion having a shape corresponding to a shape of the air discharge opening and disposed on the air discharge opening and rotatably coupled to an outer periphery of the air discharge opening;
rotating shaft members rotatably coupling the rim portion to the annular frame; and
a support frame rotatably supported on a partition wall provided in the housing and contacting the rear end of the air guide,
wherein the support frame is provided with a contacted surface in contact with the rear end of the air guide,
wherein the contacted surface is configured as a curved surface corresponding to a turning locus of the rear end of the air guide when the air guide rotates, to be in contact with the rear end of the air guide on an entire circumference of the hollow when the air guide rotates, and
wherein the curved surface is curved depending on a curvature of a circle or a sphere whose radius is a distance from a center of a virtual straight line connecting the rotating shaft members on both sides of the air guide to the rear end of the air guide.

2. The wind-direction adjustable air purifier of claim 1, wherein the front end of the air guide is provided with the rim portion, and a plurality of guide blades connected between the rim portion and the air guide along a circumference of the air guide.

3. The wind-direction adjustable air purifier of claim 1, wherein the outer circumferential surface of the rim portion is configured to have a curved surface convex in a rotational direction of the air guide, and
an inner diameter of the annular frame is configured to conform to a maximum outer diameter of the rim portion, in such a manner that the outer circumferential surface of the rim portion and an inner surface of the annular frame come into close contact with each other when the air guide rotates.

4. The wind-direction adjustable air purifier of claim 1, wherein the rotation guide further comprises:
a connection frame connecting the annular frame and the support frame to each other.

5. The wind-direction adjustable air purifier of claim 4, wherein the support frame is provided with a through hole through which the hollow and the air hole communicate with each other.

6. The wind-direction adjustable air purifier of claim 1, wherein the rotation guide is rotatably coupled to the housing, to be restricted in rotation in such a manner that a rotation position is maintained in an adjusted position.

7. The wind-direction adjustable air purifier of claim 6, wherein the rotation guide comprises an annular frame surrounding an outer circumferential surface of front end of the air guide and rotatably coupled to an outer periphery of the air discharge opening, a support frame rotatably supported on a partition wall provided in the housing and in contact with a rear end of the air guide, and a connection frame connecting the annular frame and the support frame to each other,
wherein the partition wall is provided with a rotation restricting portion restricting rotation of the support frame.

8. The wind-direction adjustable air purifier of claim 4, further comprising a light emitting display unit provided on the support frame or the partition wall, the light emitting display unit having a portion exposed externally of the housing through the hollow disposed in the air guide when the air guide is rotated obliquely in the rotation guide.

9. The wind-direction adjustable air purifier of claim 8, wherein the light emitting display unit is configured in such a manner that different portions of the light emitting display unit are exposed externally of the housing depending on a rotation direction of the air guide.

* * * * *

UNITED STATES PATENT AND TRADEMARK OFFICE
CERTIFICATE OF CORRECTION

| | | |
|---|---|---|
| PATENT NO. | : 12,000,621 B2 | Page 1 of 1 |
| APPLICATION NO. | : 16/346636 | |
| DATED | : June 4, 2024 | |
| INVENTOR(S) | : Jun-Hyoung Bae et al. | |

It is certified that error appears in the above-identified patent and that said Letters Patent is hereby corrected as shown below:

On the Title Page

Item (30) Foreign Application Priority Data (correct KR Application Number):
(KR) ........................ 10-2016-0165032 should be (KR) ........................ 10-2016-0166032

Signed and Sealed this
Seventeenth Day of September, 2024

Katherine Kelly Vidal
*Director of the United States Patent and Trademark Office*